United States Patent [19]
Kobayashi et al.

[11] Patent Number: 5,289,447
[45] Date of Patent: Feb. 22, 1994

[54] TRACK CROSS SIGNAL GENERATION CIRCUIT OF OPTICAL DISK DEVICE FOR CORRECTLY OUTPUTTING TRACK CROSS SIGNAL AND CORRECTLY AND STABLY CARRYING OUT SEEK OPERATION EVEN WITHIN HIGH-SPEED REGION OF BEAM

[75] Inventors: Shigeko Kobayashi, Kawasaki; Akira Minami, Inagi; Shigenori Yanagi, Kawasaki, all of Japan

[73] Assignee: Fujitsu Limited, Kawasaki, Japan

[21] Appl. No.: 846,122

[22] Filed: Mar. 4, 1992

[30] Foreign Application Priority Data

Mar. 5, 1991 [JP] Japan .................. 3-038542

[51] Int. Cl.$^5$ .............................. G11B 7/00
[52] U.S. Cl. .................. 369/44.28; 369/44.35; 369/44.32; 369/44.29
[58] Field of Search .............. 369/44.28, 44.25, 44.35, 369/44.36, 44.41, 44.42, 44.32, 124, 32; 250/201.5; 360/77.04, 77.07, 78.05

[56] References Cited

U.S. PATENT DOCUMENTS

| 4,849,953 | 2/1989 | Nomura et al. | 369/44.28 |
| 4,974,220 | 11/1990 | Harada | 369/44.28 |
| 5,048,002 | 9/1991 | Horie et al. | 369/44.35 |
| 5,099,468 | 3/1992 | Suzuki et al. | 369/44.36 |
| 5,172,355 | 12/1992 | Nakahara et al. | 369/44.35 |
| 5,189,653 | 2/1993 | Yanagi | 369/44.32 |

FOREIGN PATENT DOCUMENTS

| 0363022 | 11/1990 | European Pat. Off. . |
| 60-061925 | 4/1985 | Japan . |
| 60-89837 | 5/1985 | Japan . |
| 61-233430 | 10/1986 | Japan . |
| 62-195733 | 8/1987 | Japan . |
| 64-1131 | 1/1989 | Japan . |
| 1-232582 | 9/1989 | Japan . |
| 2-094116 | 4/1990 | Japan . |
| 2-143927 | 6/1990 | Japan . |
| 2-166633 | 6/1990 | Japan . |
| 2-239430 | 9/1990 | Japan . |

Primary Examiner—Aristotelis Psitos
Assistant Examiner—Thang V. Tran
Attorney, Agent, or Firm—Welsh & Katz, Ltd.

[57] ABSTRACT

A track cross signal generation circuit comprises a tracking error signal generation circuit, an offset compensation circuit, a level setting circuit, and a comparator. The comparator directly receives a tracking error signal output from the tracking error signal generation circuit without passing through the offset compensation circuit and a reference level output from the level setting circuit. Further, the comparator compares the tracking error signal with the reference level, and generates a track cross signal representing the tracks formed on an optical recording medium crossed by a beam. Namely, the gain of the tracking error signal is not affected by the offset compensation circuit even within a high-speed region of the beam. Consequently, the track zero cross signal correctly indicates tracks crossed by the beam, and correctly and stably carries out a seek operation in the high-speed region of the beam.

17 Claims, 21 Drawing Sheets

Fig. 13
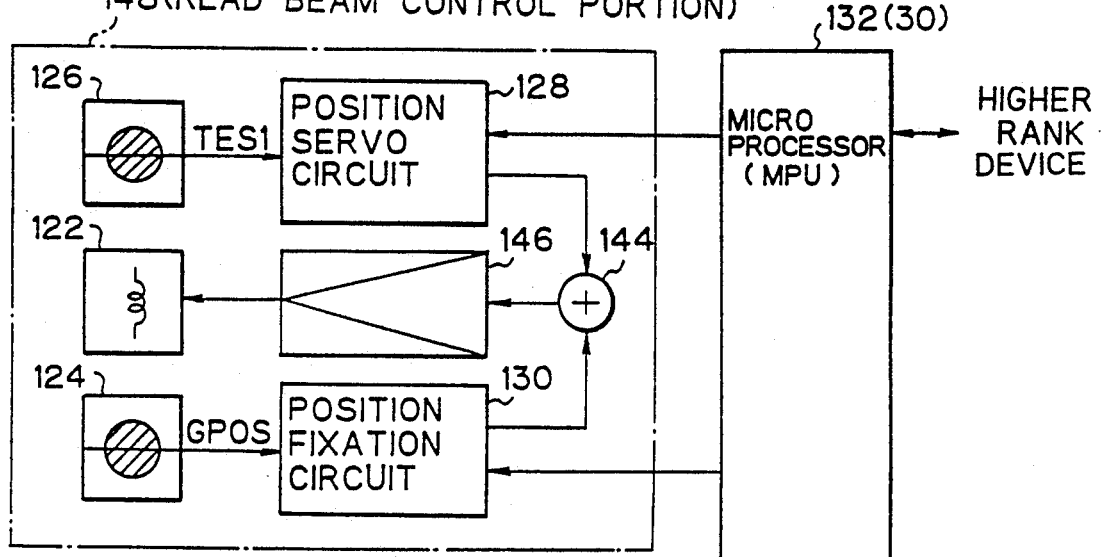
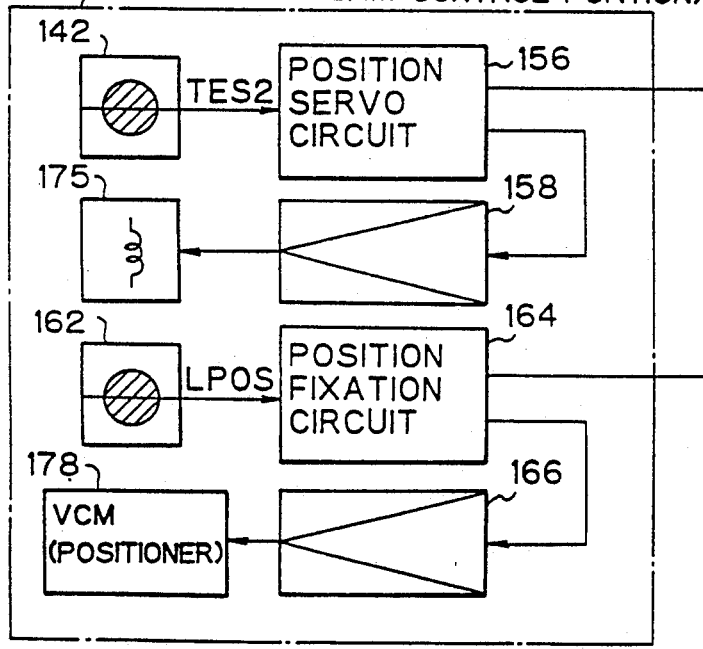
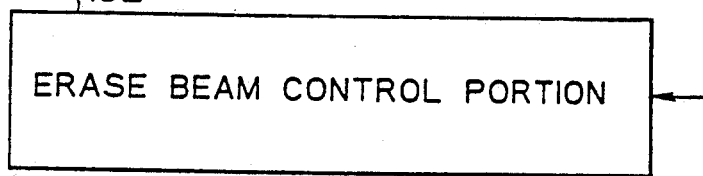

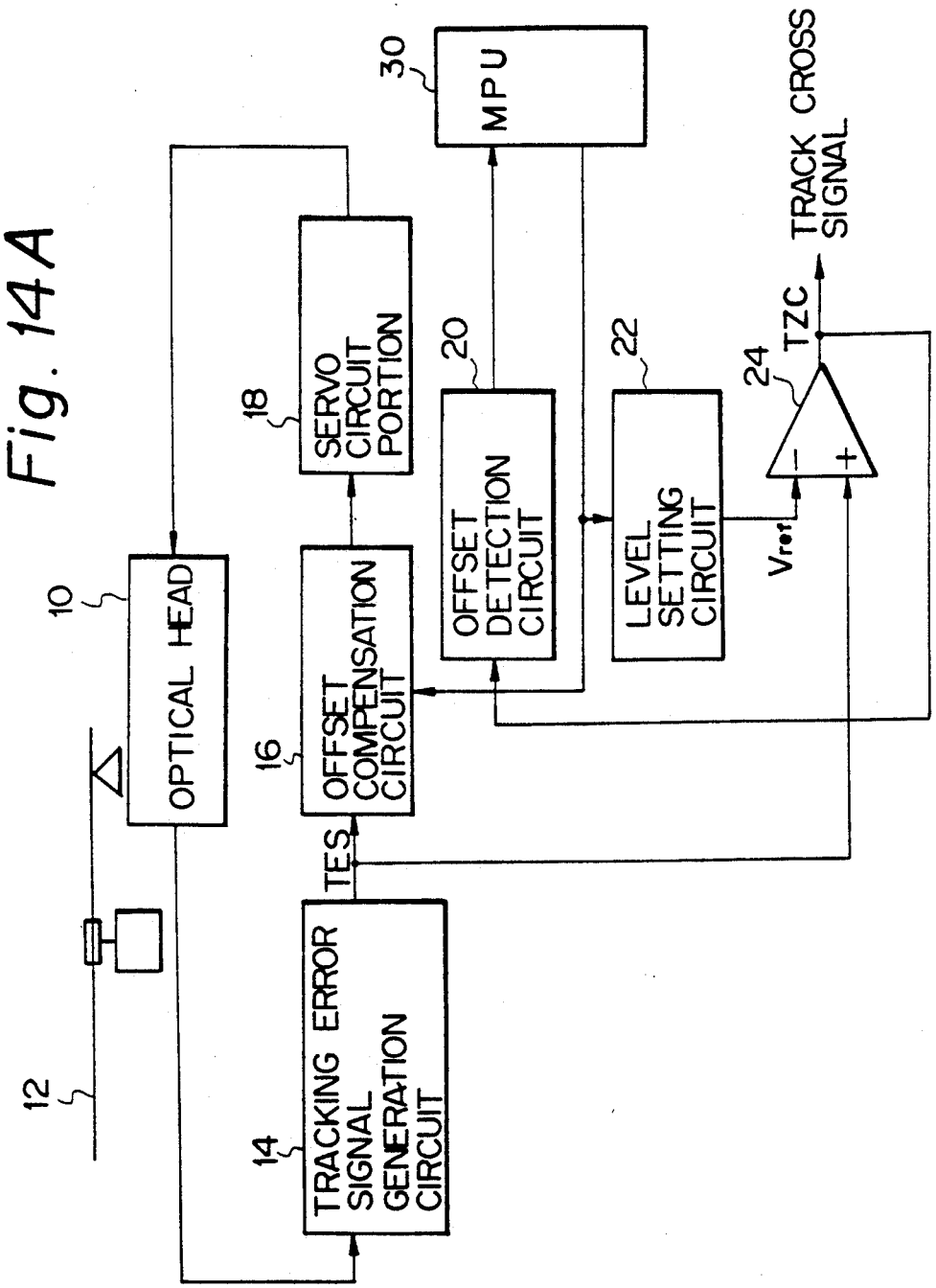

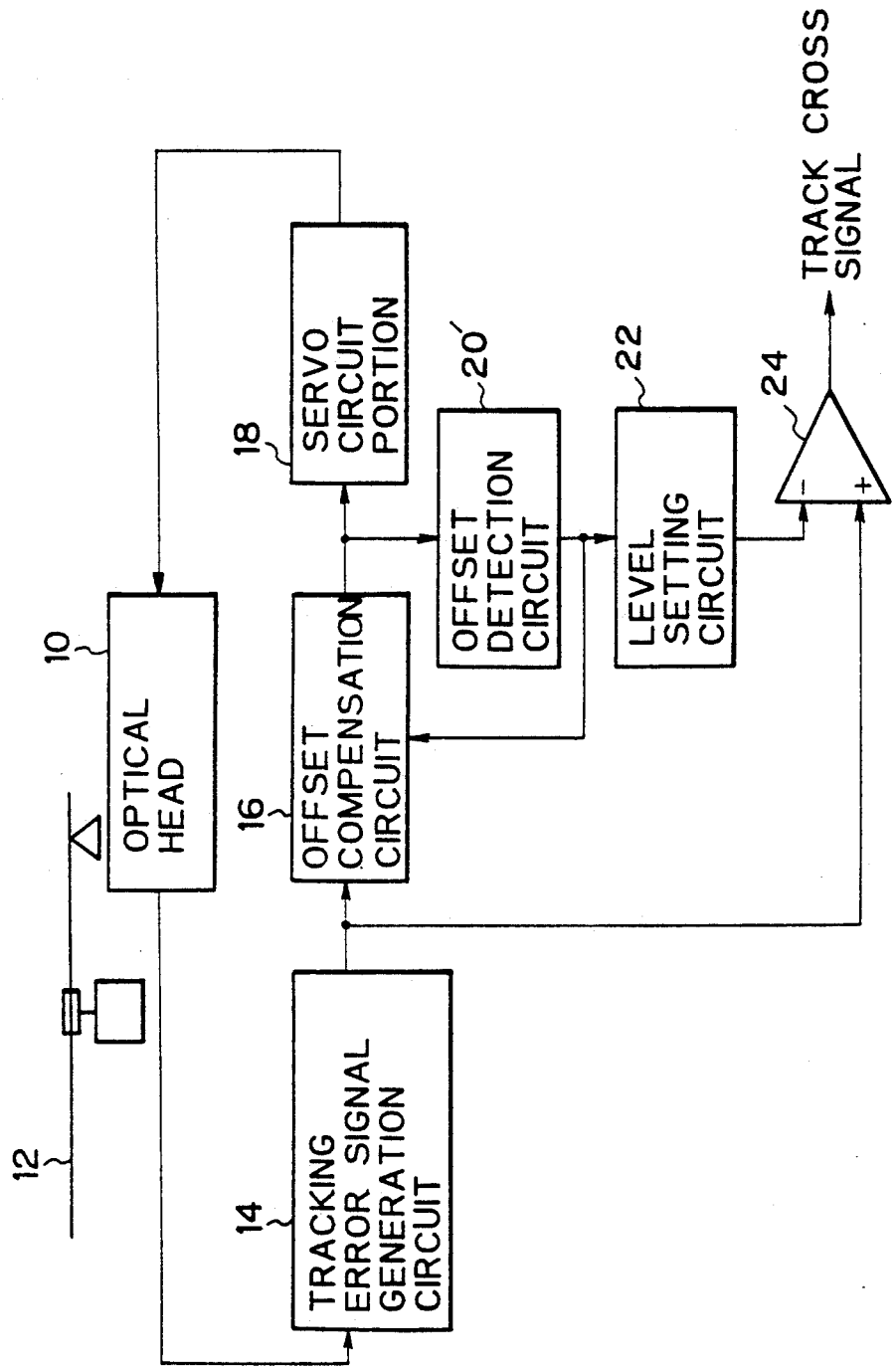

TRACK CROSS SIGNAL GENERATION CIRCUIT OF OPTICAL DISK DEVICE FOR CORRECTLY OUTPUTTING TRACK CROSS SIGNAL AND CORRECTLY AND STABLY CARRYING OUT SEEK OPERATION EVEN WITHIN HIGH-SPEED REGION OF BEAM

BACKGROUND OF THE INVENTION

1. Field of the Invention

The present invention relates to a track cross signal generation circuit, more particularly, to a track cross signal generation circuit for an optical recording medium used in an optical disk device, for generating a track cross signal, i.e., a track zero cross signal indicating tracks crossed by a beam, by using a tracking error signal.

2. Description of the Related Art

Recently, optical disk devices using an optical disk or magneto-optical disk, have been studied and developed as a large capacity storage (mass storage device), and an optical beam has been used to carry out a write operation, erase operation, and read operation therein. In the optical disk devices, an optical beam crosses tracks of an optical recording medium (optical disk, or magneto-optical disk) during a seek operation. This crossing movement provides a tracking error signal for a comparator, which generates a track zero cross signal in accordance with the tracking error signal. Based on the track zero cross signal, a track counter in which the number of tracks up to a target track is set and counted down, and when the counter reaches zero, it is determined that the target track has been reached.

During the seek operation, a target speed for controlling the speed of the beam is set in accordance with the number of tracks left in the track counter. The beam speed is also controlled by detecting the beam speed in accordance with the track zero cross signal.

The track zero cross signal is generated in accordance with the tracking error signal whose offset has been compensated in an offset compensation circuit. An example of the offset compensation method of the tracking servo system in the optical disk device is disclosed in Japanese Unexamined Patent Publication (Kokai) No. 2-166633.

Note, the frequency band of the offset compensation circuit is lower than the maximum frequency of the tracking error signal in a high-speed region of a beam during the seek operation, the gain of the tracking error signal is not sufficient in the high-speed region of the seek operation to correctly detect track crossings of the beam.

SUMMARY OF THE INVENTION

An object of the present invention is to provide a track cross signal generation circuit for an optical recording medium, which can correctly generate a track zero cross signal even within the high-speed region of a beam during a seek operation, without changing a conventional offset compensation circuit.

According to the present invention, there is provided a track cross signal generation circuit of an optical disk device comprising: a tracking error signal generation circuit for generating a tracking error signal related to tracks formed on an optical recording medium of the optical disk device in accordance with a received optical signal obtained from the optical recording medium through an optical head; an offset compensation circuit, connected to the tracking error signal generation circuit, for removing an offset from the tracking error signal output from the tracking error signal generation circuit; a level setting circuit for setting a reference level in accordance with an offset value of the tracking error signal; and a comparator, connected to the tracking error signal generation circuit and the level setting circuit, for directly receiving the tracking error signal without passing through the offset compensation circuit and the reference level output from the level setting circuit, comparing the tracking error signal with the reference level, and generating a track cross signal representing the tracks formed on the optical recording medium crossed by a beam.

The tracking error signal may be directly supplied to a positive input terminal of the comparator, and the reference level may be supplied to a negative input terminal of the comparator.

The track cross signal generation circuit may further comprise an offset detection circuit, connected to an output of the comparator, for detecting an offset value of the tracking error signal; an output of the offset detection circuit being supplied to a micro processor unit, and the level setting circuit and the offset compensation circuit being supplied with an offset removing voltage output from the micro processor unit.

The offset detection circuit may detect, with respect to a zero crossing level, the duty ratio of positive and negative portions of one cycle of a rectangular wave signal corresponding to the tracking error signal, and obtain a corresponding offset quantity in accordance with the duty ratio. The offset detection circuit may comprise first and second AND circuits, an inverter, and first and second counters, the output of the comparator being supplied to the first AND circuit and the second AND circuit through the inverter, an output of the first AND circuit being supplied to the first counter, an output of the second AND circuit being supplied to the second counter, and outputs of the first and second counters being supplied to the micro processor unit. The first and second AND circuits may receive a sample enable signal output from the micro processor unit, and the first and second counters may receive a clock signal and a counter clear signal output from the micro processor unit.

The offset detection circuit may detect respective average levels of positive and negative portions of one cycle of the tracking error signal in accordance with a zero crossing level, and obtain an offset according to a difference between the average levels. Further, the offset detection circuit may detect positive and negative peak values in one cycle of the tracking error signal, and obtain an offset in accordance with a difference between an intermediate point of the positive and negative peak values and a present zero crossing level.

The track cross signal generation circuit may further comprise an offset detection circuit, connected to an output of the offset compensation circuit, for detecting an offset value of the tracking error signal; an output of the offset detection circuit being supplied to the level setting circuit and the offset compensation circuit.

An output of the offset compensation circuit may be supplied to a servo circuit portion for controlling the optical head. The comparator may detect zero crossings of the tracking error signal and generate the track cross signal, and the level setting circuit may shift the level of a reference voltage for detecting the zero crossings for the comparator in accordance with a detected offset quantity.

The frequency band of the comparator may be set to cover the maximum frequency of the tracking error signal corresponding to the maximum speed of the beam during a seek control of the optical head. The offset compensation circuit may comprise an operational amplifier, and the level setting circuit may also comprise an operational amplifier.

According to the present invention, there is also provided an optical disk device comprising an optical head for optically recording or reproducing information to and from an optical recording medium, a voice coil motor positioner for controlling a position of the optical head, and a track cross signal generation circuit, wherein the track cross signal generation circuit includes: a tracking error signal generation circuit for generating a tracking error signal related to tracks formed on the optical recording medium of the optical disk device in accordance with a received optical signal obtained from the optical recording medium through the optical head; an offset compensation circuit, connected to the tracking error signal generation circuit, for removing an offset from the tracking error signal output from the tracking error signal generation circuit; a level setting circuit for setting a reference level in accordance with an offset value of the tracking error signal; and a comparator, connected to the tracking error signal generation circuit and the level setting circuit, for directly receiving the tracking error signal without passing through the offset compensation circuit and the reference level output from the level setting circuit, comparing the tracking error signal with the reference level, and generating a track cross signal representing the tracks formed on the optical recording medium crossed by a beam.

The optical disk device may further comprise a read beam control portion for controlling a read beam, a write beam control portion for controlling a write beam, and an erase beam control portion for controlling an erase beam.

BRIEF DESCRIPTION OF THE DRAWINGS

The present invention will be more clearly understood from the description of the preferred embodiments as set forth below with reference to the accompanying drawings, wherein:

FIG. 13 is a block diagram showing a total configuration of the example of the optical disk device applying the track cross signal generation circuit of the present invention;

FIGS. 14A and 14B are diagrams for explaining principles of track cross signal generation circuits according to the present invention;

DESCRIPTION OF THE PREFERRED EMBODIMENTS

For a better understanding of the preferred embodiments, the problems of the related art will be explained, with reference to FIGS. 1 to 6C.

Figure 1:
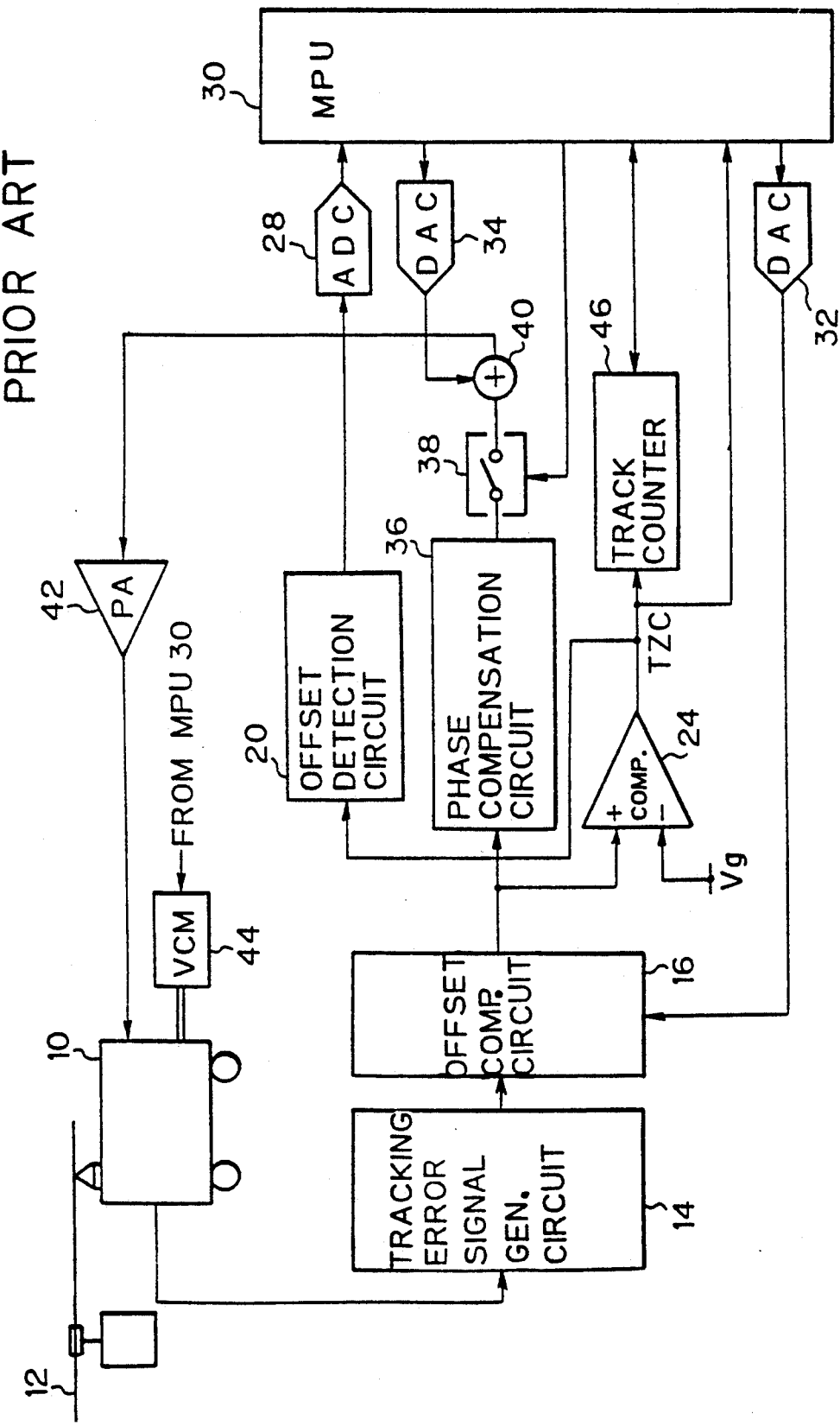
FIG. 1 is a schematic diagram showing a track cross signal generation circuit according to the prior art.
Figure 2:
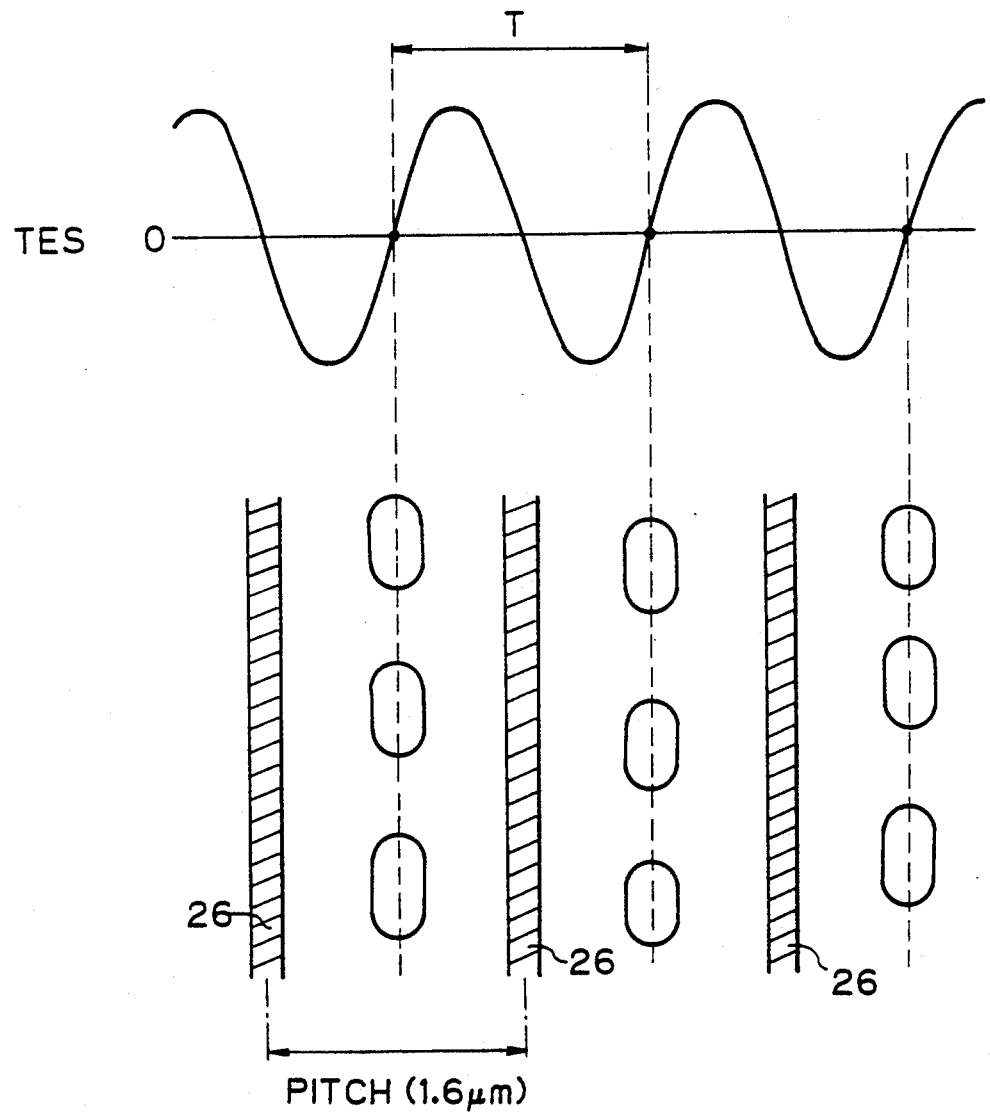
FIG. 2 is a diagram for explaining a relationship between tracks formed on an optical disk and a tracking error signal.
Figure 3:
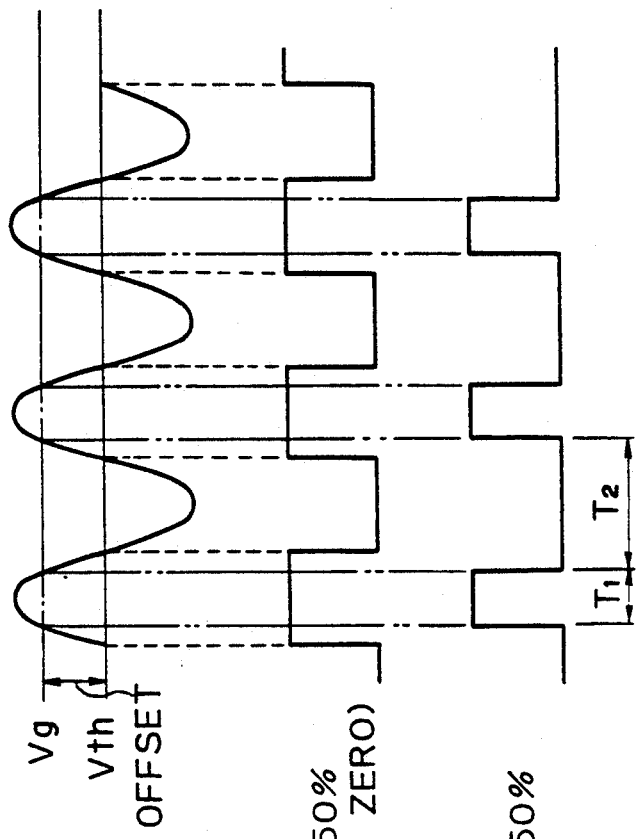
FIGS. 3A to 3C are diagrams for explaining an offset detection method based on a duty ratio.

FIG. 1 is a schematic diagram showing a track cross signal generation circuit according to the prior art, and FIG. 2 is a diagram for explaining a relationship between tracks formed on an optical disk and a tracking error signal. Note, the track cross signal generation circuit is used to generate a track cross signal (track zero cross signal) indicating tracks crossed by a beam, by using a tracking error signal.

In FIG. 1, reference numeral 10 denotes an optical head for optically recording or reproducing information to and from an optical recording medium 12 such as an optical disk and a magneto-optic disk. A received beam signal from the optical head 10 is sent to a tracking error signal generation circuit 14, which generates a tracking error signal TES in accordance with, for example, a far-field technique.

As shown in FIG. 2, the tracking error signal TES crosses a level zero at the center of each track between formed grooves 26. Note, the signal describes a cycle T of sine curve waveform, during the time that the beam is moving for one track pitch (for example, 1.6 μm).

As shown in FIG. 1, an offset of the tracking error signal TES generated by the tracking error signal generation circuit 14 is compensated in an offset compensation circuit 16. Note, the offset of the tracking error signal TES is caused by insufficient adjustment of optical systems, aging, temperature characteristics, mechanical accuracy, inclination of the optical disk (optical recording medium) 12, and the like. This offset must be compensated to correctly generate a track cross signal.

Therefore, an offset detection circuit 20 detects the offset, which is converted into a digital signal by an analog-to-digital converter (ADC) 28, and processed in a micro processor unit (MPU) 30. Thereafter, an offset removing signal is provided to the offset compensation circuit 16 through a digital-to-analog converter (DAC) 32, which then removes the offset.

Figure 4:
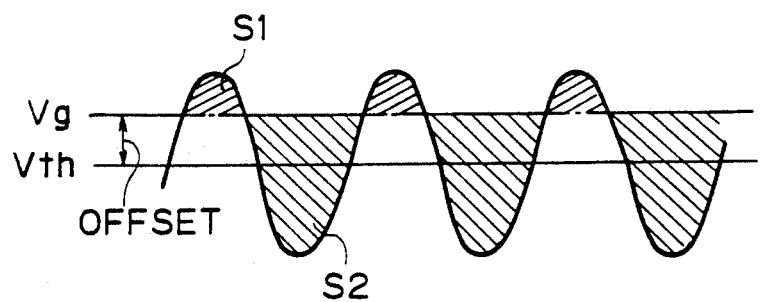
FIG. 4 is a diagram for explaining an offset detection method based on positive and negative average values.
Figure 5:
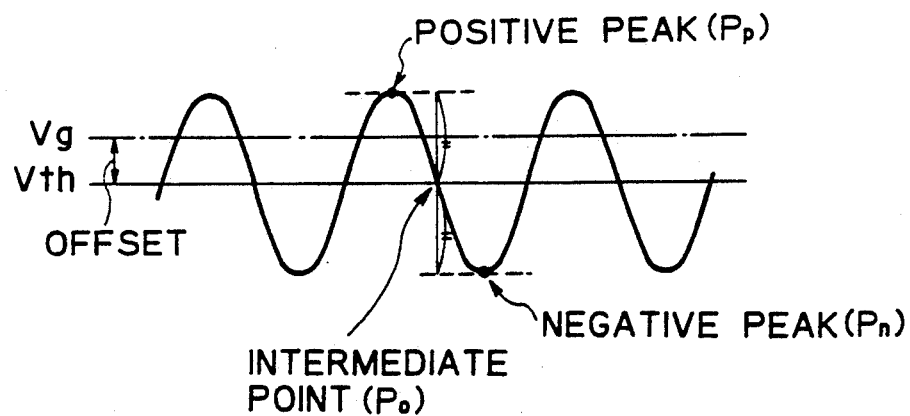
FIG. 5 is a diagram for explaining an offset detection method based on positive and negative peak values.
Figure 6:
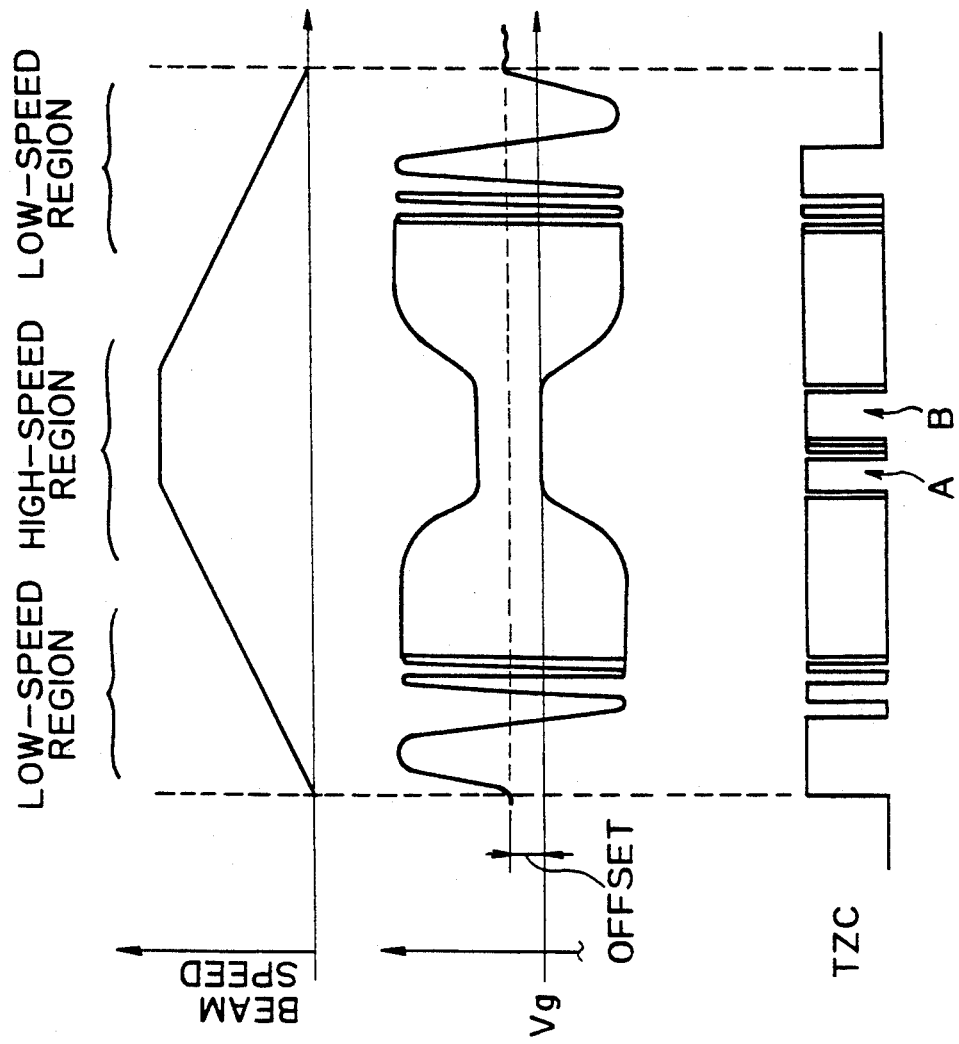
FIGS. 6A to 6C are diagrams for explaining a problem in the track cross signal generation circuit of the prior art.

Note, an offset detection method employed by the offset detection circuit 20 will be a duty ratio detection method of FIGS. 3A to 3C, a positive and negative values averaging method of FIG. 4, or a positive and negative peak values detection method of FIG. 5.

FIGS. 3A to 3C are diagrams for explaining an offset detection method based on a duty ratio, FIG. 4 is a diagram for explaining an offset detection method based on positive and negative average values, and FIG. 5 is a diagram for explaining an offset detection method based on positive and negative peak values.

First, according to the duty ratio method of FIGS. 3A to 3C, a tracking error signal TES shown in FIG. 3A provides rectangular pulses shown in FIG. 3C with respect to the ground level (GND level). For a cycle of the rectangular pulses, a positive pulse period T1 and a negative pulse period T2 are detected, and a duty ratio DR is calculated by the following:

$$DR = T1/(T1 + T2)$$

If the offset is zero, i.e., if the GND level and an original zero crossing level agree with each other, the duty ratio DR is specified to 50% (DR=50%, or Vg=Vth) as shown in FIG. 3B. Therefore, if the duty ratio is smaller than 50% (DR 21 50%, or Vg>Vth) as shown in FIG. 3C, a negative offset voltage will be detected. On the other hand, if the duty ratio DR is larger than 50% (DR>50%, or Vg<Vth), a positive offset voltage will be detected.

Next, according to the positive and negative values averaging method shown in FIG. 4, a positive average level ($S_1$) and a negative average level ($S_2$) are detected with respect to a present GND level (Vg), and a value corresponding to an offset voltage is calculated as a difference between the two average levels.

Further, according to the positive and negative peak values detection method of FIG. 5, a positive peak value (Pp) and a negative peak value (Pn) are detected, and an intermediate point ($P_0$) of the two peak values is calculated. An offset is then found as a difference between the intermediate point ($P_0$: Vth) and a present GND level (Vg).

Referring again to FIG. 1, the tracking error signal TES provided by the offset compensation circuit 16 is sent to a comparator 24, which compares the signal with a servo target voltage Vg set as a reference voltage, generates a track zero cross signal TZC, and transfers the signal TZC to a track counter 46 and an MPU 30.

During a seek operation, the MPU 30 turns off a servo switch 38, detects a beam speed in accordance with the number of inversions and an inversion period of the track zero cross signal TZC provided by the comparator 24, and calculates a speed deviation from a target speed to cancel an error in the speed. Further, during the seek operation, the MPU 30 applies a deviation voltage to an addition point 40 through a digital-to-analog converter (DAC) 34, and controls the speed of, for example, a track actuator of the optical head 10 through a power amplifier 42. The speed control is also carried out through a voice coil motor (VCM) 44.

Further, in the seek operation, the MPU 30 sets the number of tracks up to a target track in a track counter 46, detects the number of remaining tracks after counting down the track counter 46 in accordance with the track zero cross signal TZC provided by the comparator 24, and determines that the target track has been reached if the number of remaining tracks becomes zero. Further, in the seek operation, the MPU 30 turns on the servo switch 38, and carries out a tracking control for keeping the tracking error signal TES provided by a phase compensation circuit 36 zero. In addition, the MPU 30 also controls a beam speed to a target speed in accordance with the number of remaining tracks counted by the track counter 46.

Note, the above offset compensation circuit 16 for compensating the tracking error signal cannot completely remove the offset, so that a small amount of offset may remain. This remaining offset is too small and ignorable for the tracking control.

There is, however, a problem that the maximum frequency of the tracking error signal TES exceeds the frequency band of the offset compensation circuit in a high-speed region of the seek operation, resulting in a drop in the gain of the signal and incorrectly providing the track zero cross signal.

FIGS. 6A to 6C are diagrams for explaining a problem in the track cross signal generation circuit of the prior art. As shown in FIG. 6A, the maximum frequency of the tracking error signal reaches about 500 KHz in a high-speed region of the beam during the seek operation. Note, the frequency band of the offset compensation circuit 16 is about 300 KHz with a standard operational amplifier.

As shown in FIG. 6B, the gain of the tracking error signal TES is not sufficient in the high-speed region of the seek operation, and the amplitude thereof becomes smaller than the small offset left after the offset compensation. Therefore, as shown in FIG. 6C, the track zero cross signal may not be provided between A and B, to incorrectly represent track crossings.

Consequently, the track counter 46 will incorrectly count down the number of tracks to provide an incorrect number of remaining tracks, and thus reaching the target will not be correctly detected and a beam speed signal generated from the track zero cross signal TZC will be abnormal causing it to run away.

This problem may be solved by employing a high-speed operational amplifier with a wide frequency band for the offset compensation circuit 16. The high-speed operational amplifier, however, is expensive and troublesome and involves a large circuit scale because it must be provided with a circuit arrangement for preventing oscillation.

Next, an example of an optical disk device applying a track cross signal generation circuit according to the present invention will be explained with reference to FIGS. 7 to 13.

Figure 7:
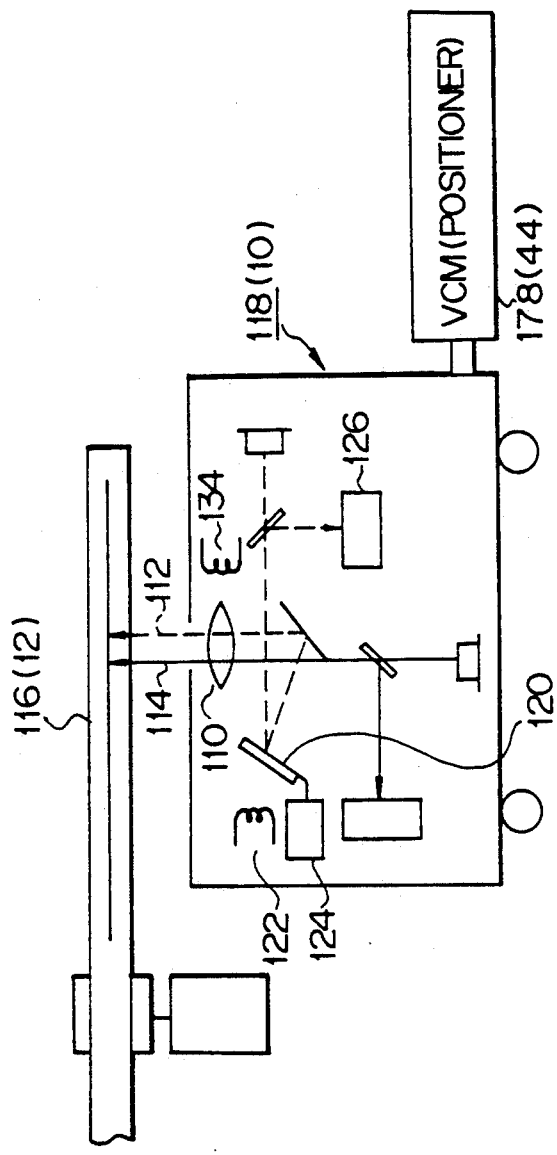
FIG. 7 is a block diagram showing an optical head in an example of an optical disk device applying a track cross signal generation circuit according to the present invention.

FIG. 7 shows an optical head in the example of the optical disk device. In FIG. 7, reference numeral 116 denotes an optical recording medium (12) such as an optical disk and a magneto-optic disk, 118 denotes an optical head (10) for optically recording or reproducing information to and from the optical recording medium 116, and 178 denotes a voice coil motor positioner (VCM 44) for controlling a position of the optical head 118. In the optical head 118, reference numeral 110 denotes an objective lens, 134 denotes a lens drive unit, 120 denotes a galvano-mirror, 122 denotes a galvano-mirror drive unit (direction change unit), 124 denotes a position detection unit, and 126 denotes tracking error detection unit. Further, reference numeral 112 denotes a read beam, and 114 denotes a write beam. Note, the position detection unit 124 detects a position of the read beam 112 in accordance with the position of the galvano-mirror 120.

Figure 8:
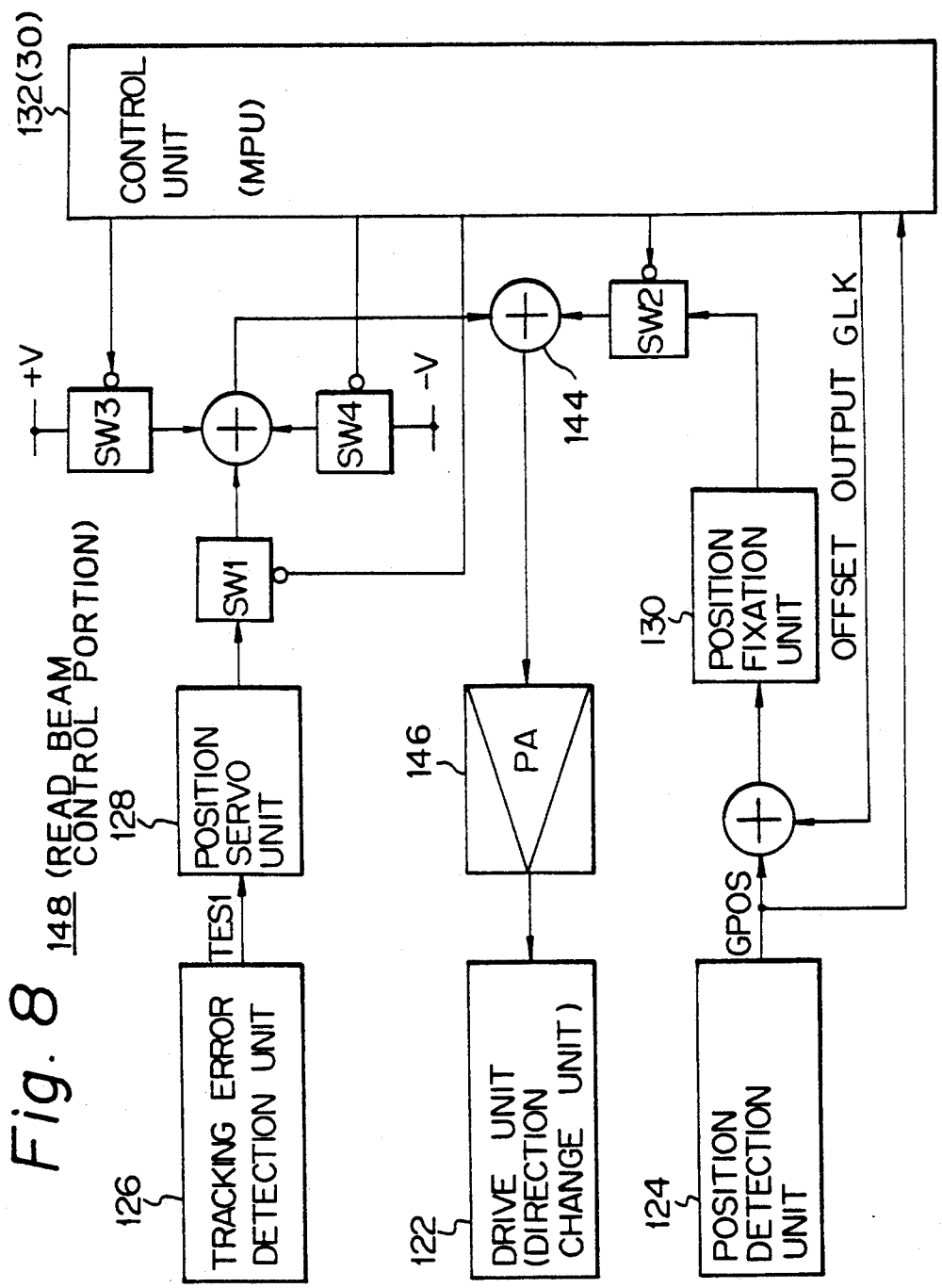
FIG. 8 is a block diagram showing a total configuration of the example of the optical disk device applying the track cross signal generation circuit of the present invention.

FIG. 8 shows a total configuration of the optical disk device applying the track cross signal generation circuit of the present invention. As shown in FIG. 8, the optical disk device further comprises a control unit 132 (MPU 30), a position servo unit 128, a power amplifier 146, a position fixation unit 130, servo switches SW1 to SW4, adders (144), and the like, to carry out various operation modes such as a position lock mode, a positional servo operation mode, a track jump mode, and the like.

Figure 9:
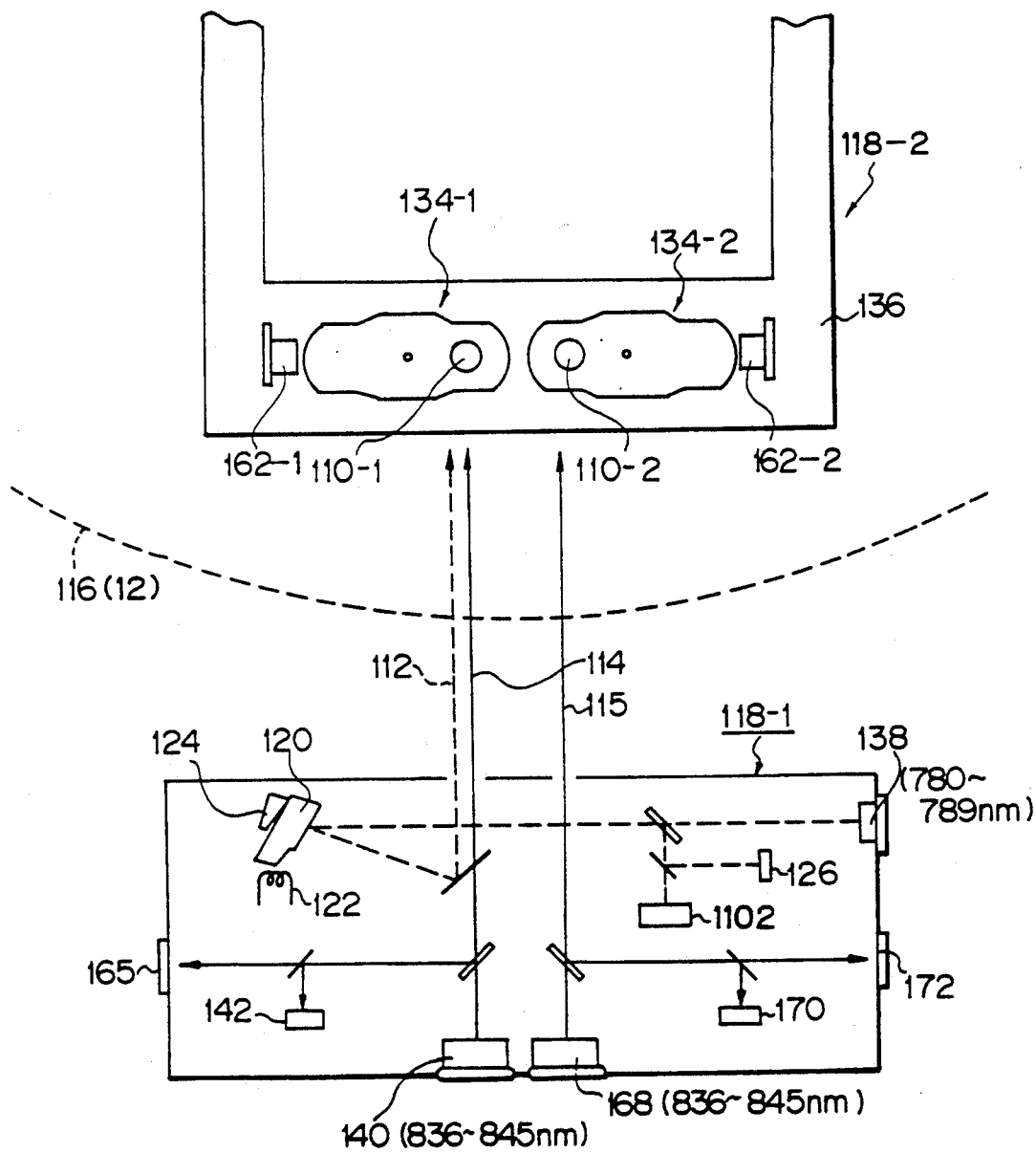
FIG. 9 is a block diagram showing a movable optical system and a fixed optical system of the optical head in the optical disk device applying the track cross signal generation circuit of the present invention.

FIG. 9 shows a movable optical system and a fixed optical system of the optical head in the optical disk device. In FIG. 9, reference numeral 118-1 denotes a fixed optical system of the optical head 118, 118-2 denotes a movable optical system of the optical head 118, and 115 denotes an erase beam.

As shown in FIG. 9, the fixed optical system 118-1 comprises a first semiconductor laser element 138 for irradiating the read beam 112 (for example, 780~789 nm), a second semiconductor laser element 140 for irradiating the write beam 114 (for example, 836~845 nm), and a third semiconductor laser element 168 for irradiating the erase beam 115 (for example, 836~845 nm). Further, the fixed optical system 118-1 comprises a write beam tracking error detector 142, a write beam photodetector 165, an erase beam tracking error detector 170, an erase beam photodetector 172, a read beam photodetector 1102, and the like.

Further, as shown in FIG. 9, the movable optical system 118-2 comprises two lens position detectors 162-1 and 162-2, two lens actuators 134-1 and 134-2, and two objective lenses 110-1 and 110-2, which are provided on a carriage 136. Note, the position of the carriage 136 is control by the VCM positioner 178. Further, the write beam 114 and read beam 112 are passed through the objective lens 110-1, and the erase beam 115 is passed through the objective lens 110-2.

Figure 10:
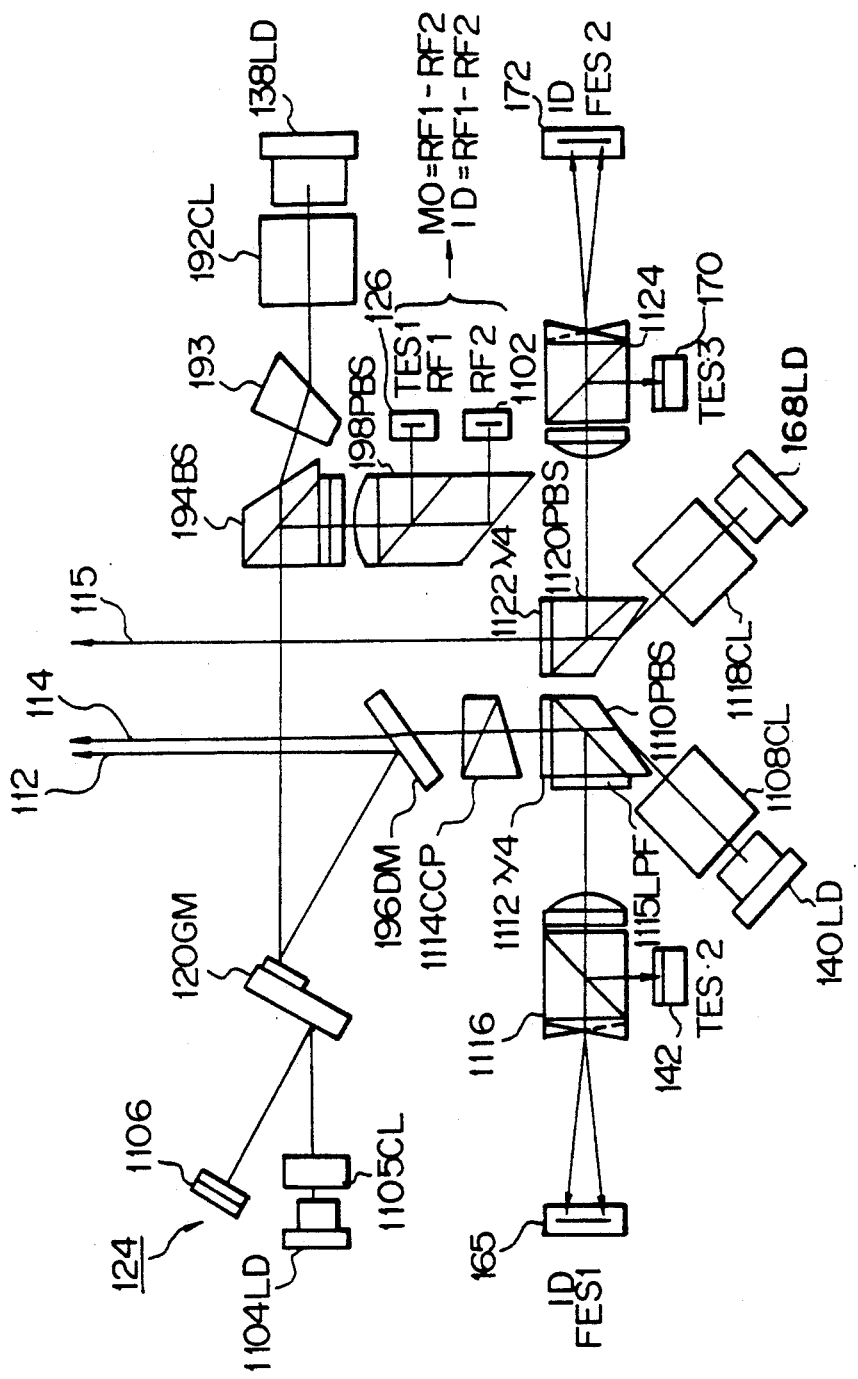
FIG. 10 is a diagram showing an optical system configuration of the optical head shown in FIG. 9.

FIG. 10 shows an optical system configuration of the optical head shown in FIG. 9. In FIG. 10, reference numerals 192, 1118 and 1108 denote collimator lenses (CL), 193 denotes a prism, 194 denotes a beam splitter (BS), and 198, 1110 and 1120 denote polarizing beam splitters (PBS). Further, in FIG. 10, reference numeral 196 denotes a dichroic mirror (DM), 1112 and 1122 denote quarter undulation plates (λ/4-plate), 1115 denotes a low pass filter (LPF), and 1124 and 1116 denote Faucault optical systems. Note, as shown in FIG. 10, the position detection unit 124 comprises a semiconductor laser element (laser diode LD) 1104, a collimator lense (CL) 1105, and a photodetector 1106.

Figure 11:
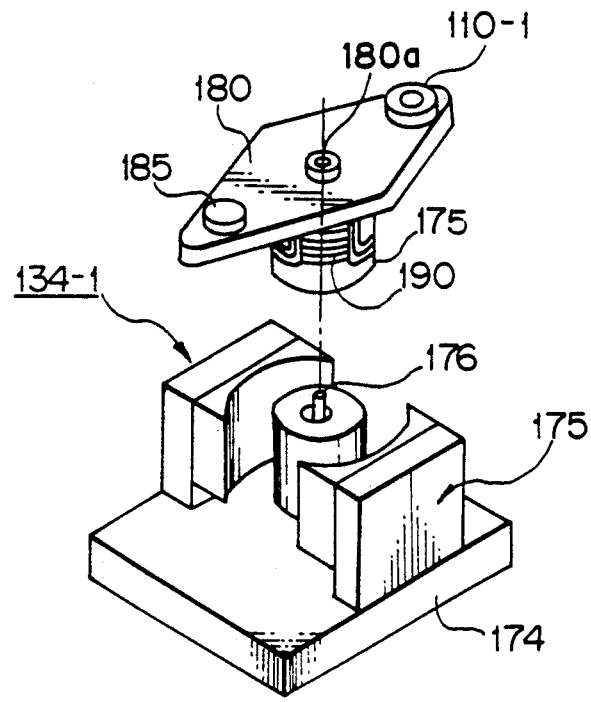
FIG. 11 is a perspective diagram showing an assembly of a lens actuator in the optical head.
Figure 12:
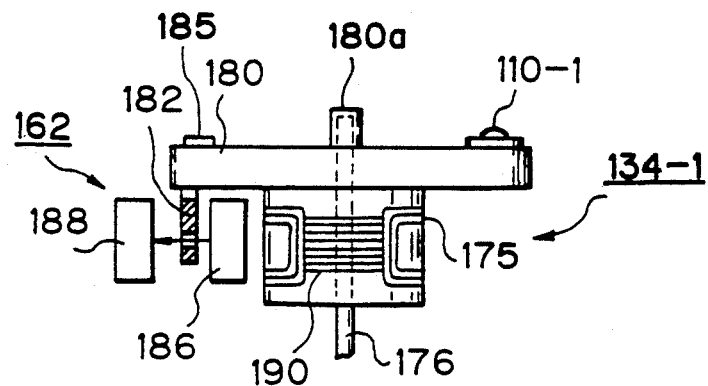
FIG. 12 is a diagram for explaining a rotation operation of the lens actuator shown in FIG. 11.

FIG. 11 is a perspective diagram showing an assembly of the lens actuator 134-1 in the optical head of FIG. 9, and FIG. 12 is a diagram for explaining a rotation operation of the lens actuator shown in FIG. 11.

As shown in FIG. 11, the lens actuator 134-1 comprises a base 174, a magnetic circuit 175, and a rotation arm 180. The rotation arm 180 is provided such that an axis portion 176 of the base 174 is inserted into a hole of 180a of the rotation arm 180, so that the rotation arm 180 can rotate around the axis portion 176. Note, in the rotation arm 180, a tracking coil 175 and a focusing coil 190 are provided to control the tracking and focusing thereof, and further a dead weight 185 is mounted to cancel the weight of the objective lens 110-1.

In FIG. 12, reference numeral 162 denotes a lens position detector 162. As shown in FIG. 12, the lens position detector 162 comprises a slit plate 182, and a light emitting portion 186, and a two-piece optical detector 188 including two photodetector elements. Note, the position of the objective lens 110-1 can be detected by the difference between two photodetector elements of the two-piece optical detector 188.

FIG. 13 shows a total configuration of an example of the optical disk device applying the track cross signal generation circuit of the present invention. In FIG. 13, reference numeral 148 denotes a read beam control portion for controlling a read beam, 150 denotes a write beam control portion for controlling a write beam, and 152 denotes an erase beam control portion for controlling an erase beam. As shown in FIG. 13, the read beam control portion 148 comprises the position servo unit 128, the tracking error detection unit 126, the power amplifier 146, the galvano-mirror drive unit 122, the position fixation circuit 130, the position detection unit 124, and the adder 144, which are shown in FIG. 8. Further, the write beam control portion comprises a position servo cirucuit 156, the write beam tracking error detector 142, a power amplifier 158, the magnetic circuit 175, a position fixation circuit 164, the lens position detector 162, a power amplifer 166, and VCM positioner 178.

Note, the above optical disk device shown in FIGS. 7 to 13 is an example of an application of the track cross signal generation circuit according to the present invention. Namely, other optical disk devices having various configurations can be applied to the track cross signal generation circuit of the present invention.

Below, the preferred embodiments of a track cross signal generation circuit according to the present invention will be explained, with reference to the accompanying drawings.

FIGS. 14A and 14B are diagrams for explaining the principles of track cross signal generation circuits according to the present invention. In FIG. 14A, reference numeral 10 denotes an optical head, 12 denotes an optical recording medium (optical disk, or magneto-optical disk), 14 denotes a tracking error signal generation circuit, 16 denotes an offset compensation circuit, 18 denotes a servo circuit portion, 20 denotes an offset detection circuit, 22 denotes level setting circuit, 24 denotes a comparator, and 30 denotes a micro processor unit (MPU).

The tracking error signal generation circuit 14 is used to generate a tracking error signal TES for tracks formed on the optical disk (optical recording medium) 12 in accordance with a received optical signal obtained from the optical disk 12 through the optical head 10. The offset compensation circuit 16 is used to remove an offset contained in the tracking error signal TES output from the tracking error signal generation circuit 14 in accordance with an output (offset value) from the MPU 30, and supply the offset removed signal to the servo circuit portion 18. The offset detection circuit 20 is used to detect an offset contained in an output signal (TZC) of the comparator 24, and supply the detected offset to the MPU 30, which are described in detail with reference to FIG. 16.

The comparator 24 is used to directly receive the tracking error signal TES from the tracking error signal generation circuit 14 not through the offset compensation circuit 16, compare the signal TES with a predetermined reference level (Vref), and generate a track cross signal TZC representing the tracks crossed by a beam. The level setting circuit 22 is used to correct the reference level in accordance with the offset value output from the MPU 30, and set the corrected reference level Vref into the comparator 24. Namely, the level setting circuit 22 shifts the level of a zero-cross detecting reference voltage (Vref) for the comparator 24 in accordance with a detected offset quantity (offset value output from the MPU 30). Note, the comparator 24 detects zero crossings of the tracking error signal and generates the track cross signal TZC. Further, the frequency band of the comparator 24 is set to cover the maximum frequency of the tracking error signal TES corresponding to the maximum beam speed during a seek operation of the optical head 10.

In FIG. 14B, reference numeral 20' denotes an offset detection circuit. By comparing the configurations of the track cross signal generation circuits shown in FIGS. 14A and 14B, the offset detection circuit 20' of FIG. 14B receives an output of the offset compensation circuit 16, and the level setting circuit 22 directly receives an output of the offset detection circuit 20'. Note, the offset detection circuit 20 of FIG. 14A detects the offset by using the track cross signal TZC output from the comparator 24, but the offset detection circuit 20' of FIG. 14B detects the offset by using the offset compensation circuit 16. In these configurations shown in FIGS. 14A and 14B, the offset detection circuits 20 and 20' are used to detect the offset, and the level setting circuit 22 is used to correct the reference level in accordance with the offset detected by the offset detection circuits 20 and 20' and sets the corrected reference level Vref into the comparator 24.

Below, the track cross signal generation circuit of embodiments will be explained with reference to the principle of FIG. 14A, but the track cross signal generation circuits according to the present invention can be also constituted as that shown in FIG. 14B.

The offset detection circuit 20 can detect an offset in accordance with:

(1) a duty ratio of positive and negative portions of a cycle of a rectangular wave signal corresponding to the tracking error signal TES, with respect to a zero crossing level, which is already described with reference to FIGS. 3A to 3C;

(2) a difference between a positive average level and a negative average level of a cycle of the tracking error signal TES with respect to the zero crossing level, which is already described with reference to FIG. 4; or (3) a difference between a present zero crossing level and an intermediate point of positive and negative peak values in a cycle of the tracking error signal TES, which is already described with reference to FIG. 5.

The tracking error signal generation circuit 14 is used to generate a tracking error signal TES for tracks formed on the optical disk (optical recording medium) 12 in accordance with a received optical signal obtained from the optical disk 12 through the optical head 10. The offset compensation circuit 16 is used to remove an offset contained in the tracking error signal TES and supply the offset removed signal to the servo circuit portion 18. The offset detection circuit 20 is used to detect an offset contained in an output of the offset compensation circuit 16 and set an offset compensation quantity in the offset compensation circuit 16.

In the above track cross signal generation circuits, the tracking error signal is sampled in front of the offset compensation circuit 16 whose frequency band is restricted, and supplied to the comparator 24. Therefore, the gain of the tracking error signal TES will not drop even if the maximum frequency of the signal TES exceeds the frequency band of the offset compensation circuit 16 in a high-speed region of the seek operation, because the signal TES is not passed through the offset compensation circuit. Consequently, the invention correctly provides the track zero cross signal TZC even within the high-speed region of the beam speed.

The level of the reference value to be compared with the tracking error signal TES whose offset has not been compensated is shifted for the detected offset, so that the reference voltage is always set to a zero crossing point of the tracking error signal. Consequently, the invention simply and at a low cost detects the track zero cross signal that is an equivalent of one obtained with an offset compensated signal.

Figure 15:
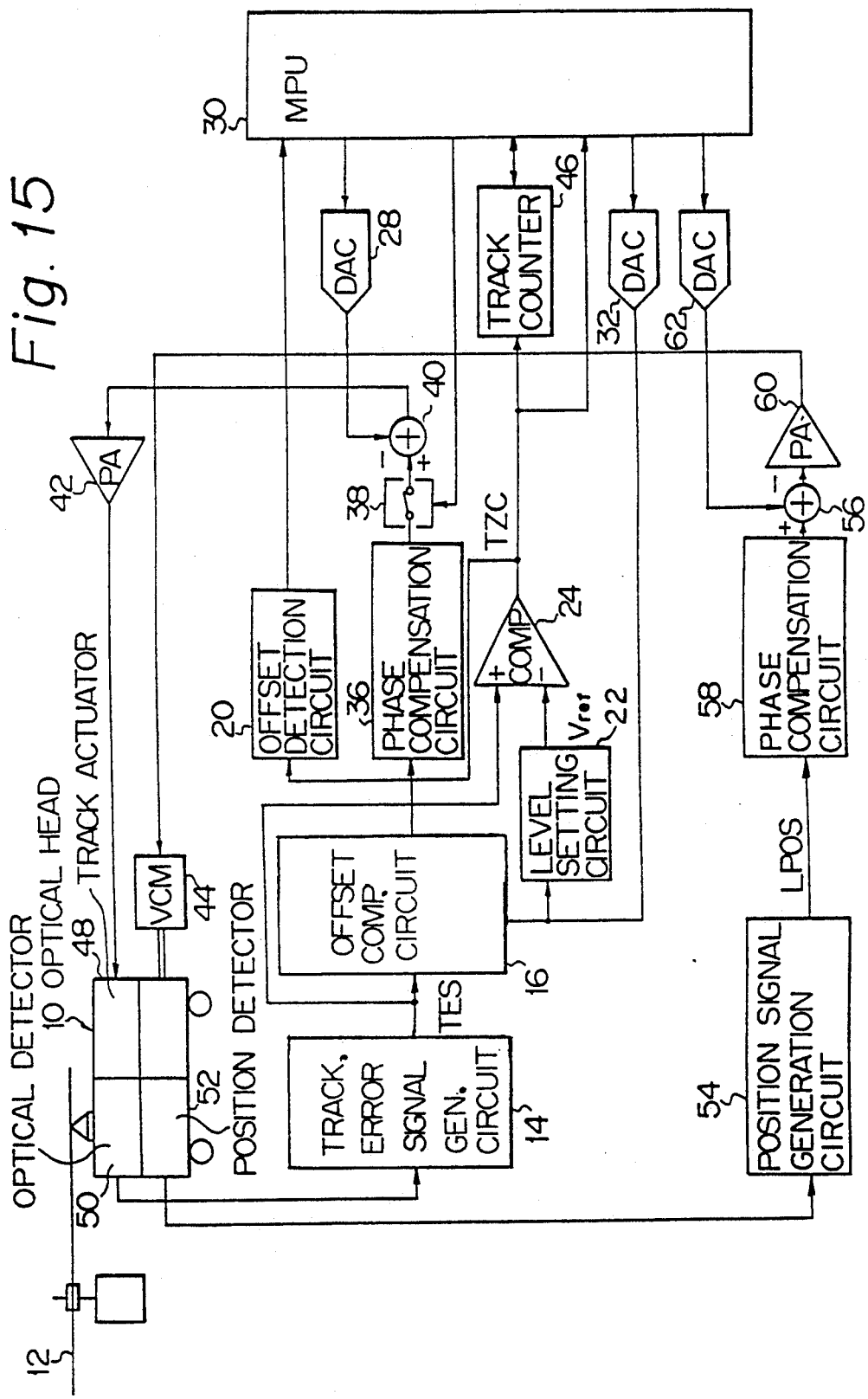
FIG. 15 is a schematic diagram showing an embodiment of the track cross signal generation circuit shown in FIG. 14A.

FIG. 15 is a schematic diagram showing an embodiment of a track cross signal generation circuit of the present invention. In FIG. 15, reference numeral 10 is an optical head for reading information from an optical recording medium 12 such as an optical disk and a magneto-optic disk. The optical head 10 includes a track actuator 48 for positioning a beam to a track on the optical recording medium, an optical detector 50 employing a two-piece photodetector known as a servo detector for detecting a tracking error signal, and a position detector 52 for detecting a neutral position of the track actuator 48. Note, the optical head 10 is moved by a voice coil motor (VCM) 44 in a direction of crossing tracks.

In FIG. 15, reference numeral 14 denotes a tracking error signal generation circuit for generating a tracking error signal TES in accordance with a far-field method (push-pull method) based on a received optical signal provided by the optical detector 50, i.e., the two-piece photodetector, of the optical head 10. An offset of the tracking error signal TES provided by the tracking error signal generation circuit 14 is removed by an offset compensation circuit 16. In order to remove the offset in the offset compensation circuit 16, there is arranged an offset detection circuit 20.

In this track cross signal generation circuit, the offset detection circuit 20 detects the duty ratio of a track zero cross signal TZC, and in accordance with the duty ratio, finds an offset to be compensated, as will be explained in more detail later.

The tracking error signal whose offset has been removed in the offset compensation circuit 16 is provided to a servo circuit portion (18) for driving the track actuator 48 of the optical head 10. The servo circuit portion comprises a phase compensation circuit 36, a servo switch 38, an adder 40, and a power amplifier 42. The phase compensation circuit 36 advances the phase of a high-frequency component of the tracking error signal, thereby compensating the phase.

In FIG. 15, reference numeral 30 denotes a micro processor unit (MPU) 30, and the MPU 30 controls the servo switch 38. Namely, when the MPU 30 carries out a seek operation in accordance with an instruction from a higher rank device, the MPU 30 turns off the servo switch 38, and when carrying out a tracking operation, turns on the servo switch 38. Note, during the tracking operation with the servo switch 38 being turned off, the adder 40 receives a kickback signal for bringing the beam backward for one spiral track from a digital-to-analog converter (DAC) 28 under the control of the MPU 30. Note, the track actuator 48 is subjected to the kickback operation, in accordance with the kickback signal.

Further, as shown in FIG. 15, in the track cross signal generation circuit, a positional servo circuit portion to move the optical head 10 is provided for the VCM 44. Note, the positional servo circuit portion for the VCM 44 comprises a positional signal generation circuit 54 for generating a positional signal LPOS in accordance with an output of the position detector 52 of the optical head 10, an adder 56, a phase compensation circuit 58, and a power amplifier 60.

The positional signal LPOS provided by the positional signal generation circuit 54 has a signal voltage that is zero when the track actuator 48 is at a neutral position. The polarity of the positional signal is changed depending on the moving direction of the track actuator with respect to the neutral position, in proportion to the quantity of the movement. The adder 56 receives the positional signal LPOS and an output of a digital-to-analog converter (DAC) 62.

When the MPU 30 receives a seek operation instruction, the DAC 62 provides a speed control voltage for controlling the speed of the VCM 44 and moving the same to a target track position. The DAC 62 provides the adder 56 with zero volts during a tracking operation. In this case, double servo control is carried out for driving the VCM 44 such that the positional signal LPOS is always kept at zero. Note, the phase compensation circuit 58 advances the phase of a high-band component of the positional signal LPOS provided from the adder 56, and the power amplifier 60 drives a coil of the VCM 44. Further, in addition to the servo system working for the track actuator 48 and VCM 44 of the optical head 10, there is a comparator 24 and a level setting circuit 22, for generating a track zero cross signal TZC indicating tracks crossed by a beam during a seek operation.

A positive input terminal of the comparator 24 directly receives the tracking error signal TES from the tracking error signal generation circuit 14. Namely, the tracking error signal provided to the comparator 24 is not subjected to offset compensation by the offset compensation circuit 16. The level setting circuit 22 provides a negative input terminal of the comparator 24 with a reference voltage Vref, which serves as a zero crossing level for the tracking error signal TES. The reference voltage Vref set by the level setting circuit 22 is generated in accordance with an offset removing voltage provided thereto as well as to the offset compensation circuit 16 through the offset detection circuit 20, the MPU 30, and the DAC 32.

Next, an operation of the track cross signal generation circuit shown in FIG. 15 will be explained.

The tracking error signal generation circuit 14 generates a tracking error signal TES in accordance with a received optical output provided by the optical detector 50 of the optical head 10. The tracking error signal provided by the tracking error signal generation circuit 14 is directly sent to the comparator 24 and sliced by the reference voltage Vref output from the level setting circuit 22, to generate a track zero cross signal TZC.

Note, the comparator 24 is made of a high-speed comparator whose maximum frequency exceeds 500 KHz, to deal with a maximum frequency of about 500 KHz of the tracking error signal TES in a high-speed region of a beam during a seek operation.

The track zero cross signal TZC generated by the comparator 24 is sent directly to the MPU 30 and to the track counter 46. The MPU 30 calculates a beam moving speed in accordance with the track zero cross signal TZC from the comparator 24.

The beam moving speed is calculated in accordance with any one of the following data:

(1) the number of crossed tracks per unit time; and
(2) an inverse number of a track crossing time.

Therefore, if the track zero cross signal TZC incorrectly reflects track crossings, an erroneous speed may be detected, and the speed control during the seek operation may drastically deteriorate and the seek operation cannot stabilize.

In the case of starting the seek operation, the number of tracks existing between a track on which the beam is presently positioned and a target track is preset in the track counter 46, and the counter counts down from the preset value in accordance with the track zero cross signal TZC during the seek operation. By reading the track counter 46, the MPU 30 can grasp the number of remaining tracks up to the target track, and prepares a target control speed in accordance with the number of the remaining tracks.

When the track counter 46 counts zero, it is understood that the beam has reached the target track, so that the seek operation is changed to a tracking operation. During the operation of the track counter 46 based on the track zero cross signal TZC, a counting error may occur if the track zero cross signal TZC incorrectly reflects track crossings. If this occurs, the seek operation becomes incorrect, and the target track may not be reached, so that retrials (seek operations) should be carried out and a seek time is greatly extended.

The offset compensation circuit 16, the offset detection circuit 20, the comparator 24, and the level setting circuit 22, which are the main parts of the embodiment shown in FIG. 15, will be explained in more detail.

Figure 16:
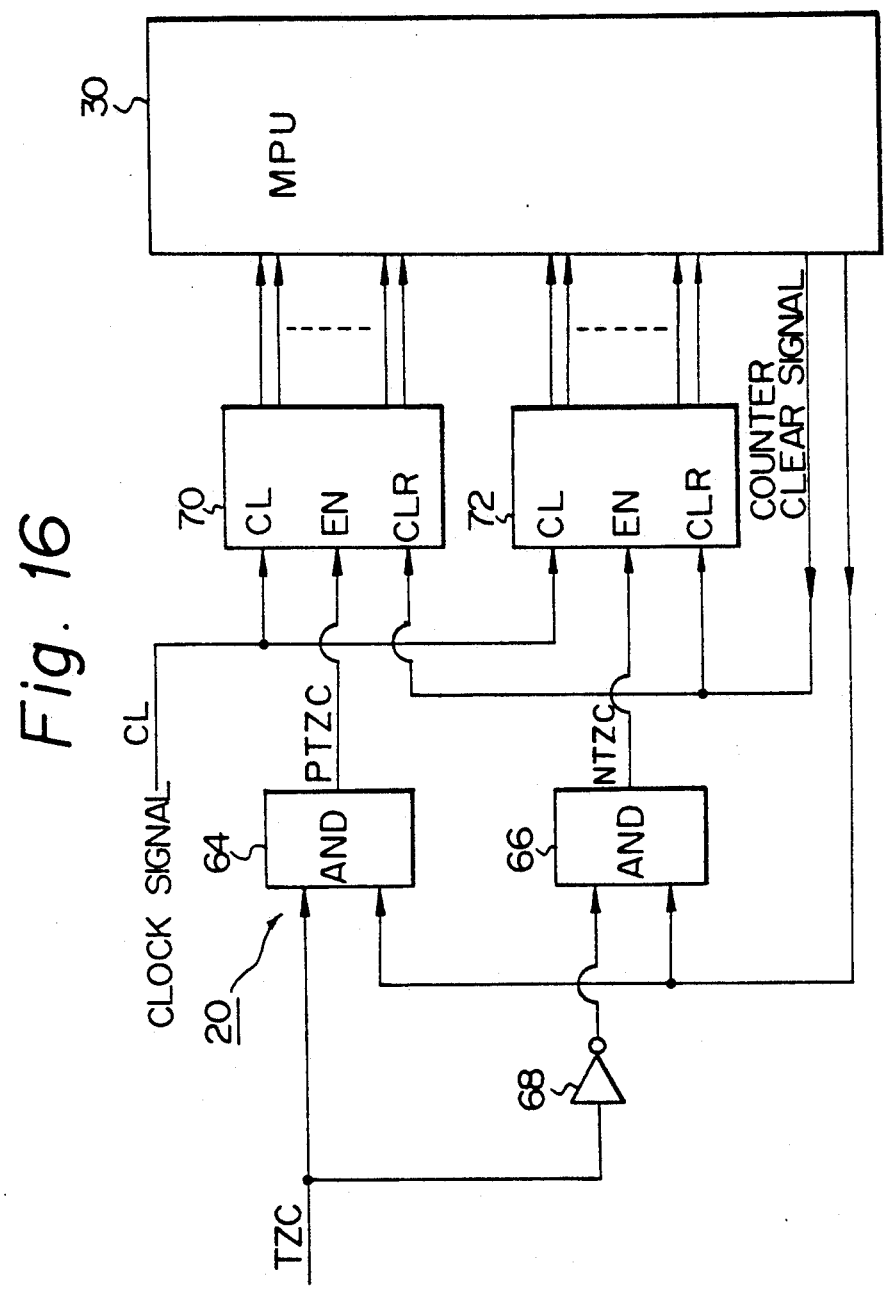
FIG. 16 is a block circuit diagram showing an offset detection circuit of the track cross signal generation circuit shown in FIG. 15.
Figure 17:
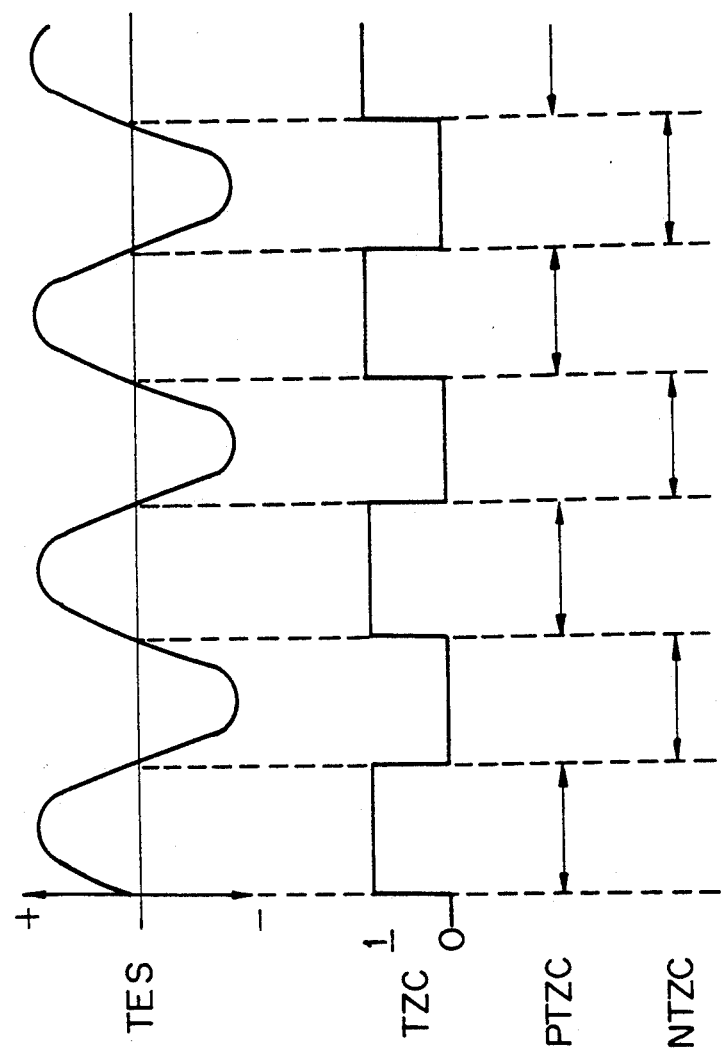
FIGS. 17A to 17D are diagrams showing signal waveforms in the track cross signal generation circuit of the present invention.

FIG. 16 shows the offset detection circuit 20 of the track cross signal generation circuit shown in FIG. 15. Note, this offset detection circuit 20 achieves the duty ratio detection method, which is already described with reference to FIGS. 3A to 3C.

As shown in FIG. 16, the offset detection circuit 20 comprises AND circuits 64 and 66, an inverter 68, and counters 70 and 72. The track zero cross signal TZC output from the comparator 24 is directly provided to an input of the AND circuit 64, and further, the signal TZC is inverted by the inverter 68 and provided to an input of the AND circuit 66. Note, the other inputs of both of the AND circuits 64 and 66 are supplied with a sample enable signal output from the MPU 30, and these AND circuits 64 and 66 are put in an enable state (asserted state) only during an offset detecting period determined by the sample enable signal.

The counters 70 and 72 are cleared before carrying out predetermined duty ratio detection by a counter clear signal output from the MPU 30. The counter 70 counts clock pulses (clock signal) CL during a period of level "1" of the track zero cross signal TZC provided through the AND circuit 64. On the other hand, the counter 72 counts the clock pulses CL during a period of level "0" of the track zero cross signal TZC provided through the AND circuit 66.

The MPU 30 reads the counted values (PTZC, NTZC) output from the counters 70 and 72, calculates the duty ratio of the track zero cross signal TZC, and changes data given to the DAC 32 shown in FIG. 15 for removing an offset in accordance with the calculated duty ratio.

FIGS. 17A to 17D are diagrams showing signal waveforms at various points of the offset detection circuit 20 shown in FIG. 16.

The track zero cross signal TZC is generated in accordance with the tracking error signal TES. As described above, the counter 70 counts a period of level "1" of the track zero cross signal TZC and generates a signal (counted value of PTZC), and the counter 72 counts a period of level "0" of the signal TZC and generates a signal (counted value of NTZC).

Figure 18:
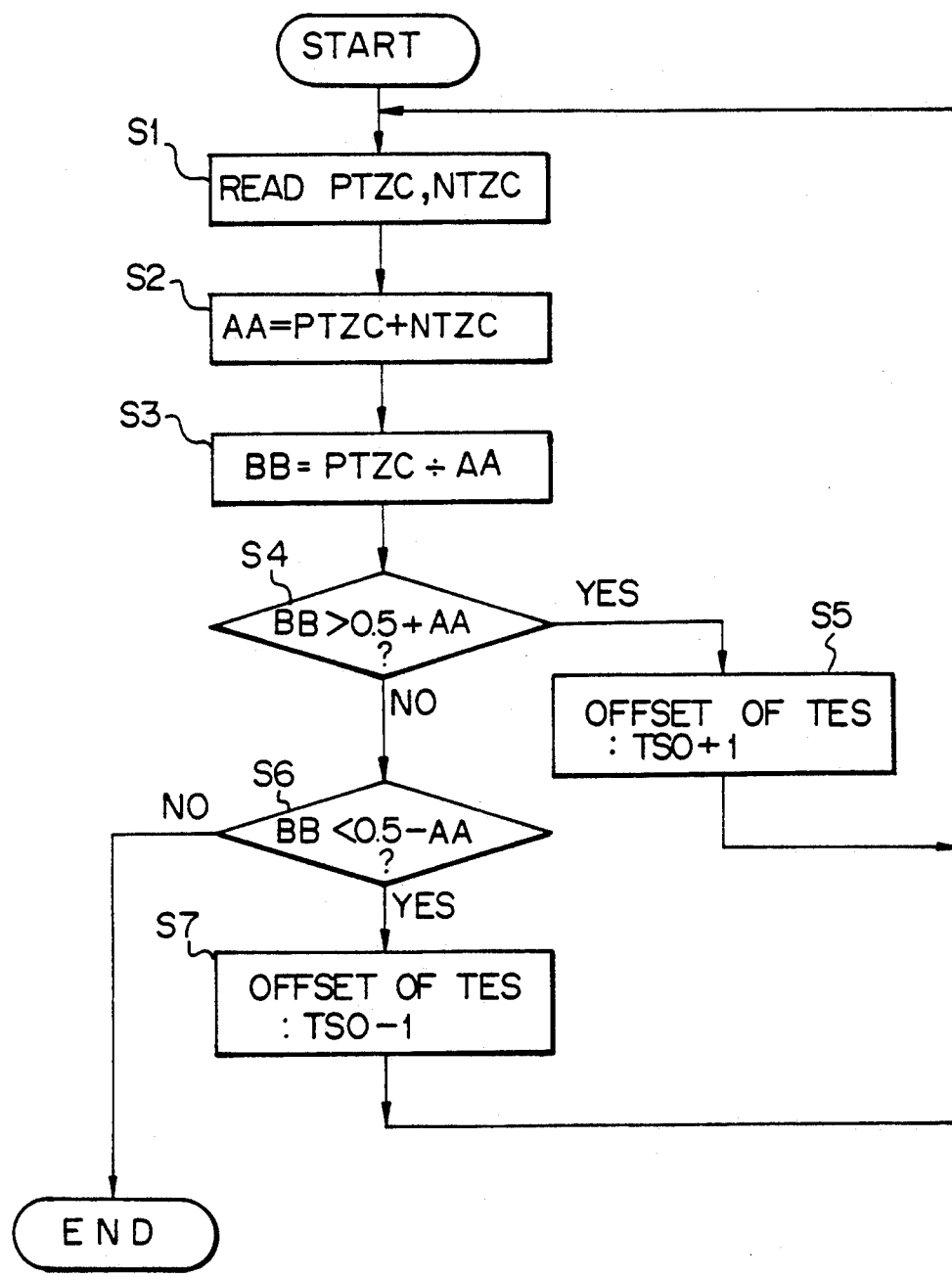
FIG. 18 is a flowchart showing an example of calculation processes of a duty ratio and an offset, carried out in the MPU shown in FIG. 15.
Figure 19:
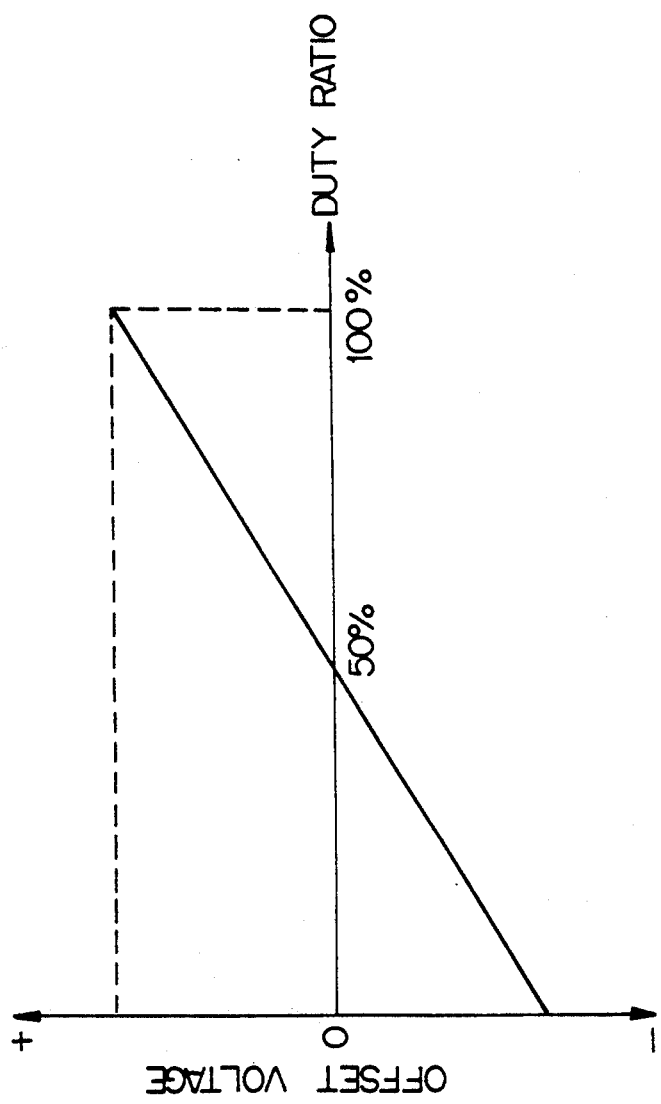
FIG. 19 is a diagram for explaining a relationship between a duty ratio and an offset voltage.

FIG. 18 is a flowchart showing an example of an offset correction process (calculation processes of a duty ratio and an offset), carried out in the MPU shown in FIG. 15, and FIG. 19 is a diagram explaining the relationship between a duty ratio and an offset voltage.

First, as shown in FIG. 18, in step S1, the counted values of PTZC and NTZC output from the counters 70 and 72 are read by the MPU 30. Next, in step S2, the counted values of PTZC and NTZC are added to each other to calculate a period AA, and in step S3, the counted value of PTZC representing a period of level "1" is divided by the period AA to calculate a duty ratio BB.

The flow proceeds to step S4, and in step S4, when the calculated duty ratio BB is larger than 0.5 plus a correction value AA (BB>(0.5 AA)), it is determined that a positive offset is occurring, as is apparent in the offset voltage characteristics relative to duty ratios shown in FIG. 19. Then, the flow proceeds to step S5, a present TES offset value TSO is counted up (incremented) by one, and the flow returns to step S1.

On the other hand, when the condition of step S4 does not stand, the flow proceeds to step S6 and the duty ratio BB is checked to determine whether or not the duty ratio BB is smaller than 0.5 minus the correction value AA (0.5−AA). In step S6, when the calculated duty ratio BB is smaller than 0.5 minus the correction value AA (BB<(0.5−AA)), it is determined that a negative offset is occurring, as is apparent in the offset voltage characteristics relative to duty ratios shown in FIG. 19. Then, the flow proceeds to step S7, a present TES offset value TSO is counted down (decremented) by one, and the flow returns to step S1. Note, in step S6, when the calculated duty ratio BB is larger than 0.5 minus the correction value AA (BB>(0.5−AA)), that is the equation $(0.5-AA) \leq BB \leq (0.5+AA)$ is established, the offset correction process is completed, or the present offset is maintained within a torelance thereof.

Figure 20:
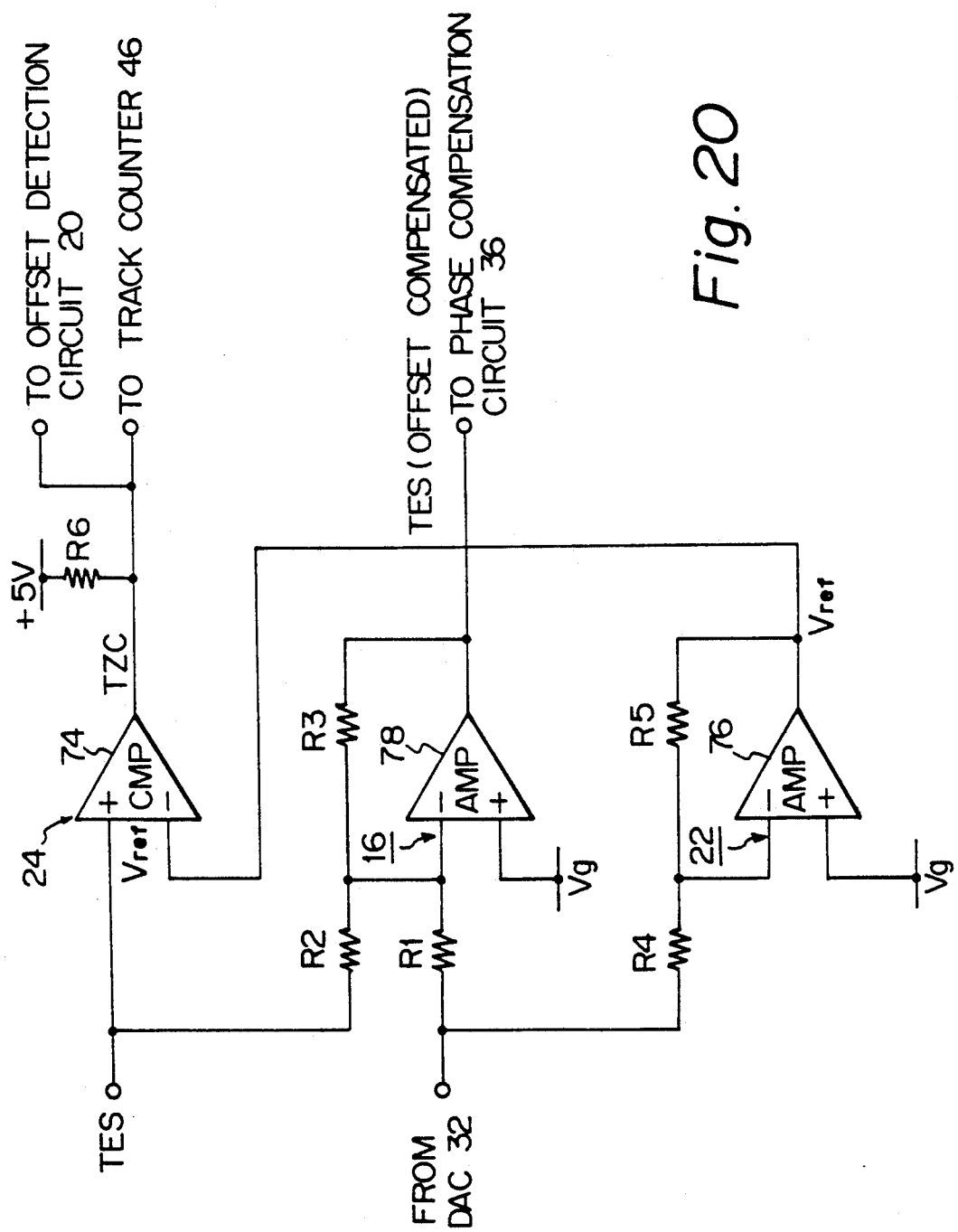
FIG. 20 is a circuit diagram showing an offset compensation circuit, a level shifting circuit, and a comparator of the track cross signal generation circuit shown in FIG. 15.

FIG. 20 shows concrete examples of the offset compensation circuit 16, comparator 24, and level setting circuit 22 according to the embodiment of FIG. 15, and FIGS. 21A to 21E show signal waveforms of various points in the circuits shown in FIG. 20.

As shown in FIG. 20, the comparator 24 comprises a comparator 74 whose frequency characteristics cover a maximum frequency of 500 KHz corresponding to a beam maximum speed. A positive input terminal of the comparator 74 directly receives the tracking error signal TES (FIG. 21A) output from the tracking error signal generation circuit 14. An output of the comparator 74 is connected to a resistor R6 and pulled up by a power source voltage of +5 volts through the resistor R6, to generate the track zero cross signal TZC (FIG. 21E) representing a level "1" by 5 volts and a level "0" by zero volts.

Figure 21A:
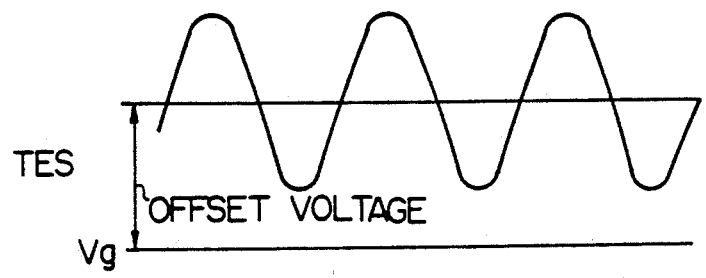
FIGS. 21A to 21E are diagrams showing signal waveforms of various points in the track cross signal generation circuit shown in FIG. 20.
Figure 21B:
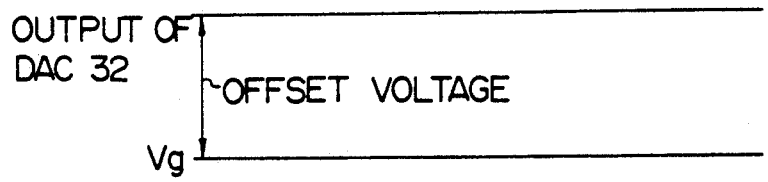
Figure 21C:
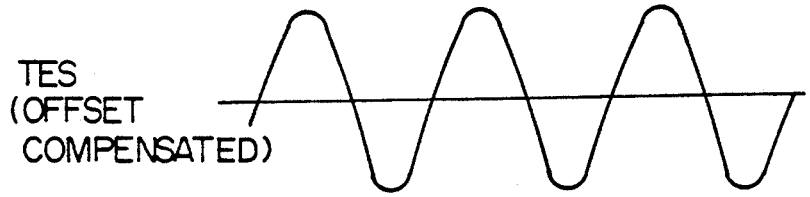
Figure 21D:
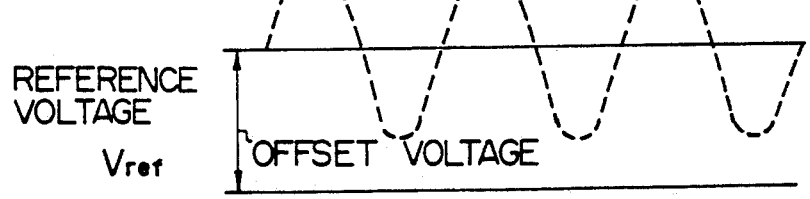
Figure 21E:

A negative input terminal of the comparator 74 receives an output (Vref; FIG. 21D) of the level setting circuit 22 employing an operational amplifier 76. A negative input terminal of the operational amplifier 76 of the level setting circuit 22 receives an offset voltage (FIG. 21B) output from the DAC 32 through a resistor R4. A positive input terminal of the operational amplifier 76 receives a regulated voltage Vg.

The output of the operational amplifier 76 is fed back to its negative input terminal through a resistor R5. The operational amplifier 76 serves as an adder, which adds the regulated voltage Vg to the offset voltage from the DAC 32, to generate the reference voltage Vref. The reference voltage Vref is applied to the negative input terminal of the comparator 74 of the comparator 24, which slices the tracking error signal with the reference voltage Vref.

The offset compensation circuit 16 comprises an operational amplifier 78. A negative input terminal of the operational amplifier 78 receives the offset voltage (FIG. 21B) output from the DAC 32 through a resistor R1, as well as the tracking error signal TES (FIG. 21A) through a resistor R2. An output (FIG. 21C) of the operational amplifier 78 is supplied to the phase compensation circuit 36, and fed back to its negative input terminal through a resistor R3. Note, the tracking error signal TES and the offset signal of the DAC 32 supplied to the operational amplifier 78 have opposite polarities. Therefore, the offset voltage of the DAC 32 is subtracted from the tracking error signal TES in the operational amplifier 78, which thus provides the offset-compensated tracking error signal TES (FIG. 21C) to the phase compensation circuit 36 of FIG. 15.

Note, a value of the input resistor R1 of the operational amplifier 78 is equal to that of the input resistor R4 of the operational amplifier 76.

As described above, FIG. 21A shows the tracking error signal TES, and a zero crossing level of the signal TES is shifted from a level of the regulated voltage Vg by an offset voltage. Further, FIG. 21B shows the offset voltage generated by the DAC 32. The tracking error signal TES of FIG. 21A and the output of the DAC 32 of FIG. 21B are added to each other and supplied to the negative input terminal of the operational amplifier 78 of the offset compensation circuit 16 as shown in FIG. 20. The operational amplifier 78 then generates the offset-compensated tracking error signal TES shown in FIG. 21C.

Further, FIG. 21D shows the reference voltage Vref that is equal to the offset voltage provided by the DAC 32. Note, as shown in FIG. 20, this reference voltage Vref is generated by the operational amplifier 76 of the level setting circuit 22, and acts as a slice level for the tracking error signal TES which is described by a dotted line in FIG. 21D and applied to the negative input terminal of the comparator 74. The comparator 74 then generates the track zero cross signal TZC. Namely, the comparator 74 of the comparator 24 carries out an equivalent to slicing the tracking error signal TES whose offset has been compensated by the offset compensation circuit 16, and generates the track zero cross signal TZC that is correct and is not influenced by the offset.

As described above, since the tracking error signal TES is not passed through the operational amplifier 78 of the offset compensation circuit 16 having a relatively narrow frequency band of 300 KHz, a sufficient gain is obtained for a maximum frequency of about 500 KHz of the signal TES in a high-speed range of the seek operation, and the track zero cross signal TZC is correctly obtainable through the slicing operation with the reference voltage Vref that has already considered the offset.

Figures 22A, 22B, 22C:
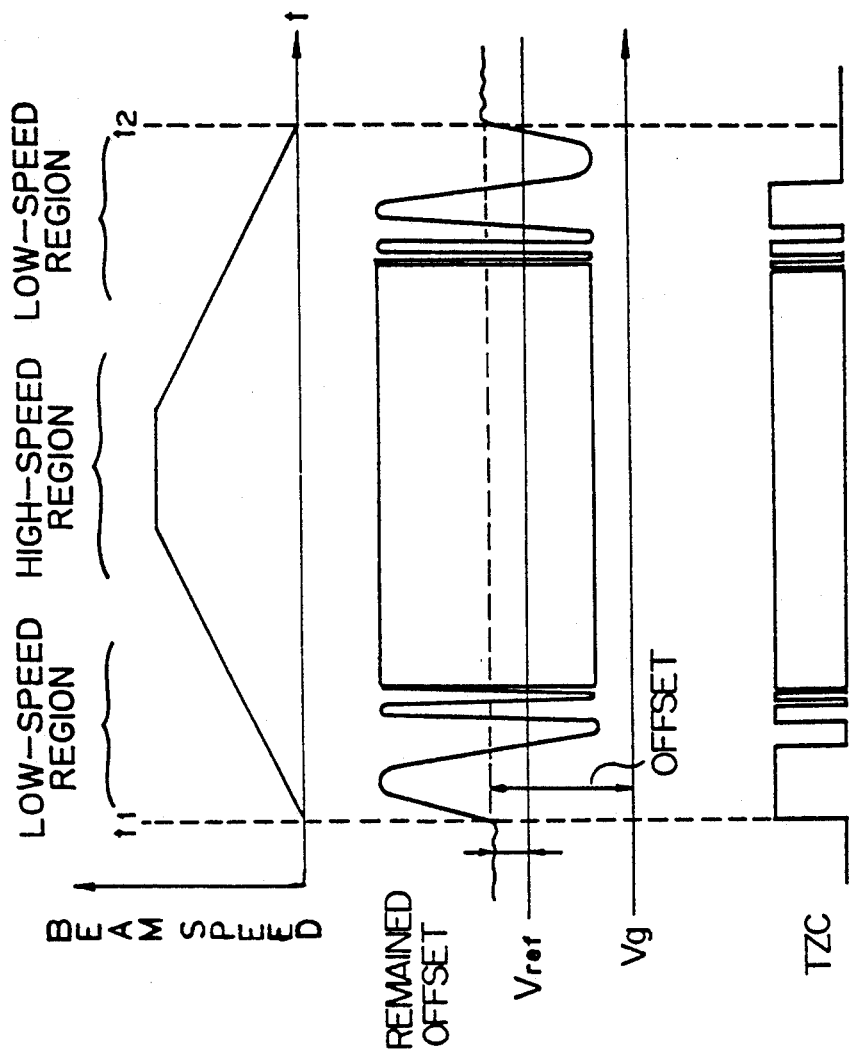
FIGS. 22A to 22C are diagrams showing a beam speed, tracking error signal, and track zero cross signal during a seek operation in the track cross signal generation circuit shown in FIG. 15.

FIGS. 22A to 22C show a beam speed, the tracking error signal TES, and the track zero cross signal TZC during the seek operation in the track cross signal generation circuit shown in FIG. 15.

As shown in FIG. 22A, the beam is accelerated from the start of the seek operation at time t1 to reach a constant speed after a predetermined time, and when the number of remaining tracks reaches a predetermined value, it is decelerated. When the beam reaches a target track at time t2, the movement of the beam is stopped.

As shown in FIG. 22B, the tracking error signal TES applied to the comparator 24 ensures a sufficient gain and constant amplitude from a low-speed region to a high-speed region of the beam, in response to changes in the beam speed. Note, the amplitude of the tracking error signal TES is never lower than the reference voltage Vref that is set in accordance with the voltage Vg to provide the slicing level for the tracking error signal TES. Therefore, as shown in FIG. 22C, the track zero cross signal TZC correctly indicates tracks crossed by the beam entirely from the low-speed region to the high-speed region of the beam.

Note, although the tracking error signal TES has a remaining offset between the reference voltage Vref and a dotted line indicating a zero crossing, this remaining offset causes no problem in tracking control.

In the above embodiment, the offset detection circuit 20 detects an offset in accordance with the duty ratio of the track zero cross signal TZC. Alternatively, the offset may be detected in accordance with the difference of a average value of positive and negative portions of the tracking error signal from a voltage Vg as shown in FIG. 4, or in accordance with the difference of an intermediate point of positive and negative peaks from a voltage Vg as shown in FIG. 5.

As described above, according to the present invention, a tracking error signal whose offset is not yet compensated in a servo circuit portion is directly applied to a comparator (24), and a reference voltage (Vref) set in accordance with a detected offset signal is supplied to the comparator to generate a track zero cross signal. Therefore, the gain of the tracking error signal is not affected by an offset compensation circuit even within a high-speed region of a beam. The track zero cross signal correctly indicates tracks crossed by the beam, and correctly and stably carries out a seek operation in the high-speed region of the beam.

Many different embodiments of the present invention may be constructed without departing from the spirit and scope of the present invention, and it should be understood that the present invention is not limited to the specific embodiments described in this specification, except as defined in the appended claims.

We claim:

1. A track cross signal generation circuit of an optical disk device comprising:
   a tracking error signal generation circuit for generating a tracking error signal related to tracks formed on an optical recording medium of said optical disk device in accordance with a received optical signal obtained from said optical recording medium through an optical head;
   an offset compensation circuit, connected to said tracking error signal generation circuit, for removing an offset from said tracking error signal output from said tracking error signal generation circuit;
   a level setting circuit for setting a reference level in accordance with an offset value based on a difference between a group potential and a zero crossing level of said tracking error signal; and
   a comparator, connected to said tracking error signal generation circuit and said level setting circuit, for directly receiving said tracking error signal without passing through said offset compensation circuit and said reference level output from said level setting circuit, comparing said tracking error signal with said reference level, and generating a track cross signal representing the tracks formed on said optical recording medium crossed by a beam.

2. A track cross signal generation circuit a claimed in claim 1, wherein said tracking error signal is directly supplied to a positive input terminal of said comparator, and said reference level is supplied to a negative input terminal of said comparator.

3. A track cross signal generation circuit as claimed in claim 1, wherein said track cross signal generation circuit further comprises an offset detection circuit, connected to an output of said comparator, for detecting an offset value of said tracking error signal; an output of said offset detection circuit being supplied to a micro processor unit, and said level setting circuit and said offset compensation circuit being supplied with an offset removing voltage output from said micro processor unit.

4. A track cross signal generation circuit as claimed in claim 3, wherein said offset detection circuit detects, with respect to a zero crossing level, the duty ratio of positive and negative portions of one cycle of a rectangular wave signal corresponding to said tracking error signal, and obtains a corresponding offset quantity in accordance with the duty ratio.

5. A track cross signal generation circuit as claimed in claim 4, wherein said offset detection circuit comprises first and second AND circuits, an inverter, and first and second counters, the output of said comparator being supplied to said first AND circuit and said second AND circuit through said inverter, an output of said first AND circuit being supplied to said first counter, an output of said second AND circuit being supplied to said second counter, and outputs of said first and second counters being supplied to said micro processor unit.

6. A track cross signal generation circuit as claimed in claim 5, wherein said first and second AND circuits receives a sample enable signal output from said micro processor unit, and said first and second counters receives a clock signal and a counter clear signal output from said micro processor unit.

7. A track cross signal generation circuit as claimed in claim 3, wherein said offset detection circuit detects respective average levels of positive and negative portions of one cycle of said tracking error signal in accordance with a zero crossing level, and obtains an offset according to a difference between said average levels.

8. A track cross signal generation circuit as claimed in claim 3, wherein said offset detection circuit detects positive and negative peak values in one cycle of said tracking error signal, and obtains an offset in accordance with a difference between an intermediate point of the positive and negative peak values and a present zero crossing level.

9. A track cross signal generation circuit as claimed in claim 1, wherein said track cross signal generation circuit further comprises an offset detection circuit, connected to an output of said offset compensation circuit, for detecting an offset value of said tracking error signal; an output of said offset detection circuit being supplied to said level setting circuit and said offset compensation circuit.

10. A track cross signal generation circuit as claimed in claim 1, wherein an output of said offset compensation circuit is supplied to a servo circuit portion for controlling said optical head.

11. A track cross signal generation circuit as claimed in claim 1, wherein said comparator detects zero crossings of said tracking error signal and generates said track cross signal, and said level setting circuit shifts the level of a reference voltage for detecting the zero crossings for said comparator in accordance with a detected offset quantity.

12. A track cross signal generation circuit as claimed in claim 1, wherein the frequency band of said comparator is set to cover the maximum frequency of said tracking error signal corresponding to the maximum speed of the beam during a seek control of said optical head.

13. A track cross signal generation circuit as claimed in claim 1, wherein said offset compensation circuit comprises an operational amplifier, and said level setting circuit comprises an operational amplifier.

14. An optical disk device comprising an optical head for optically recording or reproducing information to and from an optical recording medium, a voice coil motor positioner for controlling a position of said optical head, and a track cross signal generation circuit, wherein said track cross signal generation circuit includes:

a tracking error signal generation circuit for generating a tracking error signal related to tracks formed on said optical recording medium of said optical disk device in accordance with a received optical signal obtained from said optical recording medium through said optical head;

an offset compensation circuit, connected to said tracking error signal generation circuit, for removing an offset from said tracking error signal output from said tracking error signal generation circuit;

a level setting circuit for setting a reference level in accordance with an offset value based on a difference between a ground potential and a zero crossing level of said tracking error signal; and a comparator, connected to said tracking error signal generation circuit and said level setting circuit, for directly receiving said tracking error signal without passing through said offset compensation circuit and said reference level output from said level setting circuit, comparing said tracking error signal with said reference level, and generating a track cross signal representing the tracks formed on said optical recording medium crossed by a beam.

15. An optical disk device as claimed in claim 14, wherein said optical disk device further comprises a read beam control portion for controlling a read beam, a write beam control portion for controlling a write beam, and an erase beam control portion for controlling an erase beam.

16. An optical disk device as claimed in claim 14, wherein said tracking error signal is directly supplied to a positive input terminal of said comparator, and said reference level is supplied to a negative input terminal of said comparator.

17. An optical disk device as claimed in claim 14, wherein said track cross signal generation circuit further comprises an offset detection circuit, connected to an output of said comparator, for detecting an offset value of said tracking error signal; an output of said offset detection circuit being supplied to a micro processor unit, and said level setting circuit and said offset compensation circuit being supplied with an offset removing voltage output from said micro processor unit.

* * * * *

UNITED STATES PATENT AND TRADEMARK OFFICE
CERTIFICATE OF CORRECTION

PATENT NO. : 5,289,447
DATED : February 22, 1994
INVENTOR(S) : Kobayashi, et al.     (Page 1 of 2)

It is certified that error appears in the above-indentified patent and that said Letters Patent is hereby corrected as shown below:

In column 1, line 49, insert --so-- after "operation,"

In column 5, line 46, delete "21" and insert -->--.

In column 7, line 56, delete "control" and insert --controlled--.

In column 8, line 41, delete "cirucuit" and insert --circuit--.

In column 9, line 16, delete "14" and insert --14,--.

In column 13, line 68, delete "torelance" and insert --tolerance--.

UNITED STATES PATENT AND TRADEMARK OFFICE
CERTIFICATE OF CORRECTION

PATENT NO. : 5,289,447
DATED : February 22, 1994
INVENTOR(S) : Kobayashi, et al.   (Page 2 of 2)

It is certified that error appears in the above-indentified patent and that said Letters Patent is hereby corrected as shown below:

In column 17, line 1, delete "receives" and insert --receive--.

In column 17, line 3, delete "receives" and insert --receive--.

Signed and Sealed this

Seventeenth Day of January, 1995

Attest:

BRUCE LEHMAN

*Attesting Officer*   *Commissioner of Patents and Trademarks*